(12) United States Patent
Farha et al.

(10) Patent No.: US 12,510,908 B2
(45) Date of Patent: Dec. 30, 2025

(54) INTEGRATION OF METAL-ORGANIC FRAMEWORKS ON TEXTILE FIBERS AND FABRICS FOR THE DESTRUCTION OF NERVE AGENTS UNDER AMBIENT HUMIDITY CONDITIONS

(71) Applicant: Northwestern University, Evanston, IL (US)

(72) Inventors: Omar K. Farha, Glenview, IL (US); Zhijie Chen, Evanston, IL (US); Kaikai Ma, Evanston, IL (US); Timur Islamoglu, Evanston, IL (US)

(73) Assignee: Northwestern University, Evanston, IL (US)

( * ) Notice: Subject to any disclaimer, the term of this patent is extended or adjusted under 35 U.S.C. 154(b) by 786 days.

(21) Appl. No.: 17/779,831

(22) PCT Filed: Dec. 2, 2020

(86) PCT No.: PCT/US2020/062800
§ 371 (c)(1),
(2) Date: May 25, 2022

(87) PCT Pub. No.: WO2021/113296
PCT Pub. Date: Jun. 10, 2021

(65) Prior Publication Data
US 2023/0048741 A1    Feb. 16, 2023

Related U.S. Application Data

(60) Provisional application No. 62/942,813, filed on Dec. 3, 2019.

(51) Int. Cl.
*G05D 11/13* (2006.01)
*A62D 3/35* (2007.01)
(Continued)

(52) U.S. Cl.
CPC ............ *G05D 11/132* (2013.01); *A62D 3/35* (2013.01); *A62D 5/00* (2013.01); *B01F 23/291* (2022.01);
(Continued)

(58) Field of Classification Search
CPC .......... G05D 11/132; A62D 3/35; A62D 5/00; A62D 2101/02; A62D 2101/26;
(Continued)

(56) References Cited

U.S. PATENT DOCUMENTS 8,530,719 B1     9/2013  Peterson et al.
2013/0018112 A1  1/2013  Thielemans et al.
(Continued)

FOREIGN PATENT DOCUMENTS

CN      110507848 A     11/2019
CN      110872386 A      3/2020
(Continued)

OTHER PUBLICATIONS

Moon et al., "Detoxification of Chemical Warfare Agents Using a Zr6-Based Metal-Organic Framework/Polymer Mixture," Chemistry—A European Journal; vol. 22, Issue 42 (Oct. 2016); pp. 14864-14868.*

(Continued)

*Primary Examiner* — Matthew D Matzek
(74) *Attorney, Agent, or Firm* — Bell & Manning, LLC

(57) ABSTRACT

Textile fibers at least partially coated with a coating that includes particles of metal-organic frameworks dispersed in a polymeric base are provided. Also provided are fabrics formed from the textile fibers, protective gear and articles of clothing made from the fabrics, and methods of using the fibers and fabrics to catalyze the hydrolysis of organic molecules, such as organophosphate-based nerve agents, having hydrolysable bonds.

18 Claims, 19 Drawing Sheets

(51) Int. Cl.

| | | |
|---|---|---|
| *A62D 5/00* | (2006.01) | |
| *B01F 23/20* | (2022.01) | |
| *B01F 35/21* | (2022.01) | |
| *B01F 35/22* | (2022.01) | |
| *B01F 35/71* | (2022.01) | |
| *B01J 31/16* | (2006.01) | |
| *B08B 3/02* | (2006.01) | |
| *B08B 13/00* | (2006.01) | |
| *B60S 3/04* | (2006.01) | |
| *D06M 13/503* | (2006.01) | |
| *D06M 15/61* | (2006.01) | |
| *D06M 23/08* | (2006.01) | |
| *A62D 101/02* | (2007.01) | |
| *A62D 101/26* | (2007.01) | |
| *B01F 101/00* | (2022.01) | |
| *D06M 101/06* | (2006.01) | |
| *G06Q 30/0283* | (2023.01) | |

(52) U.S. Cl.
CPC ...... *B01F 35/2112* (2022.01); *B01F 35/2206* (2022.01); *B01F 35/714* (2022.01); *B01F 35/71805* (2022.01); *B01J 31/1691* (2013.01); *B08B 3/02* (2013.01); *B08B 13/00* (2013.01); *B60S 3/04* (2013.01); *D06M 13/503* (2013.01); *D06M 15/61* (2013.01); *D06M 23/08* (2013.01); *A62D 2101/02* (2013.01); *A62D 2101/26* (2013.01); *B01F 2101/4505* (2022.01); *B08B 2203/027* (2013.01); *D06M 2101/06* (2013.01); *G06Q 30/0283* (2013.01)

(58) Field of Classification Search
CPC .......................... B01F 23/291; B01F 35/2112; B01F 35/2206; B01F 35/714; B01F 35/71805; B01F 2101/4505; B01J 31/1691; B08B 3/02; B08B 13/00; B08B 2203/027; B08B 3/00; B60S 3/04; D06M 13/503; D06M 15/61; D06M 23/08; D06M 2101/06; G06Q 30/0283
USPC ........................................................ 428/364
See application file for complete search history.

(56) References Cited

U.S. PATENT DOCUMENTS

| | | | |
|---|---|---|---|
| 2015/0328490 A1 | 11/2015 | McDaniel | |
| 2016/0318773 A1* | 11/2016 | Wells | ..................... B01J 20/226 |
| 2017/0096394 A1 | 4/2017 | Eddaoudi et al. | |
| 2017/0128761 A1 | 5/2017 | Hupp et al. | |
| 2022/0297100 A1 | 9/2022 | Farha et al. | |

FOREIGN PATENT DOCUMENTS

| | | |
|---|---|---|
| CN | 113477229 A | 10/2021 |
| WO | WO 2021/011740 A1 | 1/2021 |

OTHER PUBLICATIONS

Peppas et al., "Hydrogels" Polymer Science: A Comprehensive Reference, vol. 9, (2012), pp. 385-395.*

Cheng Wang et al., "Polyethyleneimine-crosslinked cellulose aerogel for combustion CO2 capture," Carbohydrate Polymers 225 (2019) 115248; pp. 1-8.

Derek B. Dwyer et al., Toxic Organophosphate Hydroplysis Using Nanofiber-Templated UiO-66-NH2 Metal-Organic Framework Polycrystalline Cylinders, ACS Appl. Mater. Interfaces 2018, 10, 25794-25803.

Cong Huang et al., "Preparation of iron-based metal-organic framework @cellulose aerogel by in situ growth method and its application to dye adsorption," Journal of Solid State Chemistry 297 (2021) 122030; pp. 1-10.

Xiaoting Ma et al., "Multifunctional flexible composite aerogels constructed through in-situ growth of metal-organic framework nanoparticles on bacterial cellulose," Chemical Engineering Journal 356 (2019) 227-235.

The International Search Report and Written Opinion issued on Mar. 12, 2021 for international application No. PCT/US20/62800; pp. 1-11.

Kim, "Self-Exfoliating and Reactive Polymer (SERP) as a Protection Against Chemical Warfare Agents (CWAs);" Doctoral Dissertation, University of Massachusetts Amherst, Department of Polymer Science and Engineering (Sep. 2019); pp. 1-109.

Kim et al., "Zirconium Hydroxide-coated Nanofiber Mats for Nerve Agent Decontamination;" Chemistry an Asian Journal, vol. 12, Issue 6 (Mar. 2017); pp. 698-705.

Joseph E. Mondloch et al., "Destruction of chemical warfare agents using metal-organic frameworks," Nature Letters, Advance Online Publication, Published online: Mar. 16, 2015; pp. 1-5. DOI:10.1038/NMAT4238.

D. Banerjee et al., "Potential of Metal-Organic Frameworks for Separation of Xenon and Krypton," Accounts of Chemical Research, vol. 48, No. 2; pp. 211-219. https://doi.org/10.1021/ar5003126.

Olaf Delgado-Friedrichs et al., "Three-periodic nets and tilings: edge-transitive binodal structures," Acta Cryst. (2006), vol. A62; pp. 350-355. doi:10.1107/S0108767306022707.

Tian-Fu Liu et al., "Adding to the Arsenal of Zirconium-Based Metal-Organic Frameworks: the Topology as a Platform for Solvent-Assisted Metal Incorporation," Eur. J. Inorg. Chem. 0000, 0-0; pp. 1-5. DOI: 10.1002/ejic.201600627.

Dawei Feng et al., "A Highly Stable Porphyrinic Zirconium Metal-Organic Framework with shp—a Topology," Journal of the American Chemical Society 2014, vol. 136; pp. 17714-17717. dx.doi.org/10.1021/ja510525s.

Zhujie Chen et al., "Toward base heterogenization: A zirconium metal-organic framework/dendrimer or polymer mixture for rapid hydrolysis of a nerve-agent simulant." ACS Applied Nano Materials 2.2 (2019): 1005-1008.

Chen, Zhijie, et al. "Applying the power of reticular chemistry to finding the missing alb-MOF platform based on the (6, 12)-coordinated edge-transitive net." Journal of the American Chemical Society 139.8 Feb. 5, 2017; 3265-3274.

Chen, Zhijie, et al. "Reticular access to highly porous acs-MOFs with rigid trigonal prismatic linkers for water sorption." Journal of the American Chemical Society 141.7 (2019): 2900-2905.

Wang, Bin, et al. "Highly stable Zr (IV)-based metal-organic frameworks for the detection and removal of antibiotics and organic explosives in water." Journal of the American Chemical Society 138.19 (2016): 6204-6216.

Chen, Zhijie, et al. "Minimal edge-transitive nets for the design and construction of metal-organic frameworks." Faraday Discussions 201 (2017): 127-143.

Lyu, Jiafei, et al. "Topology and porosity control of metal-organic frameworks through linker functionalization." Chemical science 10.4 (2019): 1186-1192.

Li, Penghao, et al. "Interpenetration Isomerism in Triptycene-Based Hydrogen-Bonded Organic Frameworks." Angewandte Chemie 131.6 (2019): 1678-1683.

DeCoste, Jared B., and Gregory W. Peterson. "Metal-organic frameworks for air purification of toxic chemicals." Chemical reviews 114.11 (2014): 5695-5727.

Palomba, Joseph M., et al. "High-throughput screening of solid-state catalysts for nerve agent degradation." Chemical Communications 54.45 (2018): 5768-5771.

Gil-San-Millan, Rodrigo, et al. "Chemical warfare agents detoxification properties of zirconium metal-organic frameworks by synergistic incorporation of nucleophilic and basic sites." ACS Applied Materials & Interfaces 9.28 (2017): 23967-23973.

(56) References Cited

OTHER PUBLICATIONS

Peng Li et al., "Synthesis of nanocrystals of Zr-based metal-organic frameworks with csq-net: significant enhancement in the degradation of a nerve agent simulant," *Chem. Commun.*, 2015, 51, 10925-10928.

The International Search Report and the Written Opinion issued Nov. 24, 2020 for international patent application No. PCT/US20/42271; pp. 1-10.

Joseph E. Mondloch et al., "Destruction of chemical warfare agents using metal-organic frameworks," *Nature Materials*, vol. 14, Mar. 16, 2015; pp. 512-516.

Michael J. Katz et al., "Simple and Compelling Biomimetic Metal-Organic Framework Catalyst for the Degradation of Nerve Agent Simulants," *Angew. Chem. Int. Ed.* 2014, 53, 497-501.

Su-Young Moon et al., "Instantaneous Hydrolysis of Nerve-Agent Simulants with a Six-Connected Zirconium-Based Metal-Organic Framework," *Angew. Chem. Int. Ed.* 2015, 54, 6795-6799.

Junjie Zhao et al., Ultra-Fast Degradation of Chemical Warfare Agents Using MOF-Nanotiber Kebabs, *Angew. Chem. Int. Ed.* 2016, 55, 1-6.

Annie Xi Lu et al., "MOFabric: Electrospun Nanofiber Mats from PVDF/UiO-66-NH2 for Chemical Protection and Decontamination," *ACS Applied Materials & Interfaces* XXXX, XXX, XXX-XXX. pp. A-E. DOI: 10.1021/acsami.7b01621.

Hiroyasu Furukawa et al., "Water Adsorption in Porous Metal-Organic Frameworks and Related Materials," *Journal of the American Chemical Society* 2014, 136, 4369-4381. dx.doi.org/10.1021/ja500330a.

Moon, Su-Young, et al. "Detoxification of Chemical Warfare Agents Using a Zr6-Based Metal-Organic Framework/Polymer Mixture." *Chemistry—A European Journal* 22.42 (2016): 14864-14868.

Zhijie Chen et al., Supporting Information for "Toward base heterogenization: A zirconium metal-organic framework/dendrimer or polymer mixture for rapid hydrolysis of a nerve-agent simulant." *ACS Applied Nano Materials* 2.2 (2019): S-1 to S-10.

Chen, Haoyuan, et al. "Insights into Catalytic Hydrolysis of Organophosphate Warfare Agents by Metal-Organic Framework NU-1000." *The Journal of Physical Chemistry C* 122.23 (2018): 12362-12368.

Chen, Zhijie, et al. "Ligand-Directed Reticular Synthesis of Catalytically Active Missing Zirconium-Based Metal-Organic Frameworks." *Journal of the American Chemical Society* 141.31 (2019): 12229-12235.

De Koning, Martijn C., Marco van Grol, and Troy Breijaert. "Degradation of Paraoxon and the Chemical Warfare Agents VX, Tabun, and Soman by the Metal-Organic Frameworks UiO-66-NH2, MOF-808, NU-1000, and PCN-777." *Inorganic chemistry* 56.19 (2017): 11804-11809.

López-Maya, Elena, et al. "Textile/Metal-Organic-Framework Composites as Self-Detoxifying Filters for Chemical-Warfare Agents." *Angewandte Chemie International Edition* 54.23 (2015): 6790-6794.

Momeni, Mohammad R., and Christopher J. Cramer. "Dual Role of Water in Heterogeneous Catalytic Hydrolysis of Sarin by Zirconium-Based Metal-Organic Frameworks." *ACS Applied Materials & Interfaces* 10.22 (2018): 18435-18439.

Park, Hea Jung, et al. "Synthesis of a Zr-Based Metal-Organic Framework with Spirobifluorenetetrabenzoic Acid for the Effective Removal of Nerve Agent Simulants." *Inorganic Chemistry* 56.20 (2017): 12098-12101.

Rose, Marcus, et al. "MOF processing by electrospinning for functional textiles." *Advanced Engineering Materials* 13.4 (2011): 356-360.

Wang, Hui, et al. "Solid-Phase Detoxification of Chemical Warfare Agents using Zirconium-based Metal Organic Frameworks and the Moisture Effects-Analyze via Digestion." *ACS applied materials & interfaces* (2019).

Zhang, Yuanyuan, et al. "Preparation of nanofibrous metal-organic framework filters for efficient air pollution control." *Journal of the American Chemical Society* 138.18 (2016): 5785-5788.

Timur Islamoglu et al., "Presence vs. proximity: the role of pendant amines in the catalytic hydrolysis of a nerve agent simulant," Communication Wiley-VCH; pp. 1-5.

Chen, Znijie, et al. "Integration of metal-organic frameworks on protective layers for destruction of nerve agents under relevant conditions." *Journal of the American Chemical Society* 141.51 (2019): 20016-20021.

Liu, Yangyang, et al. "Catalytic degradation of chemical warfare agents and their simulants by metal-organic frameworks." *Coordination Chemistry Reviews* 346 (2017): 101-111.

\* cited by examiner

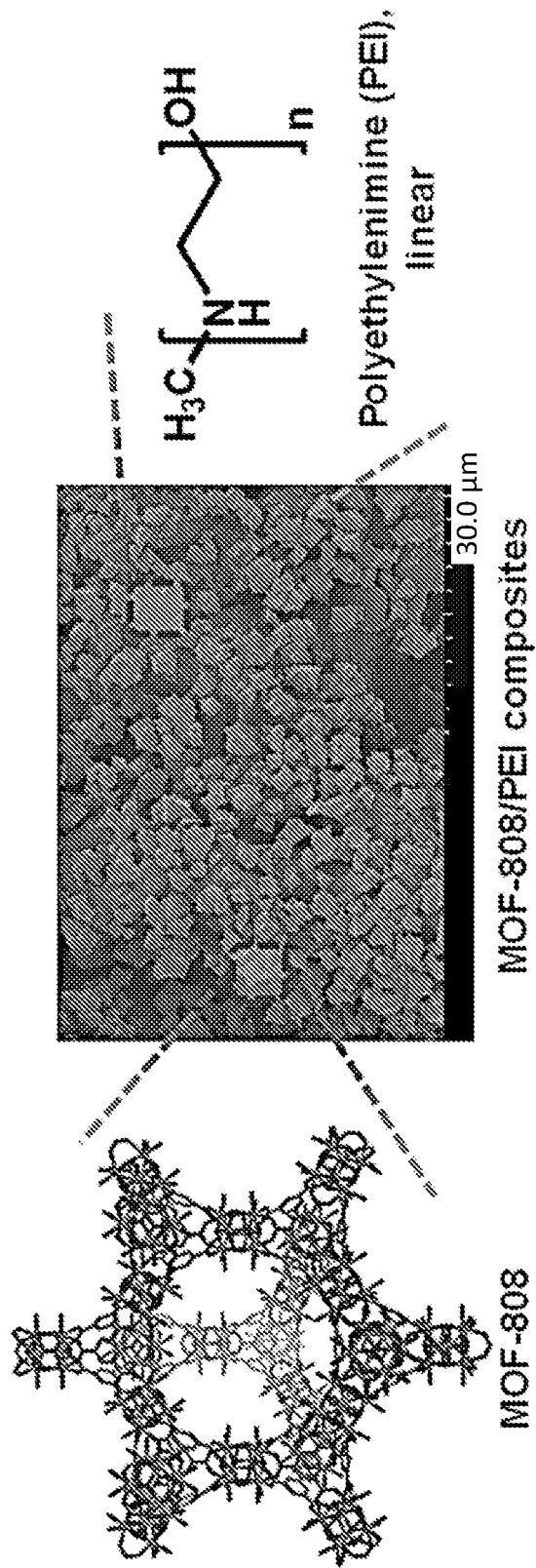
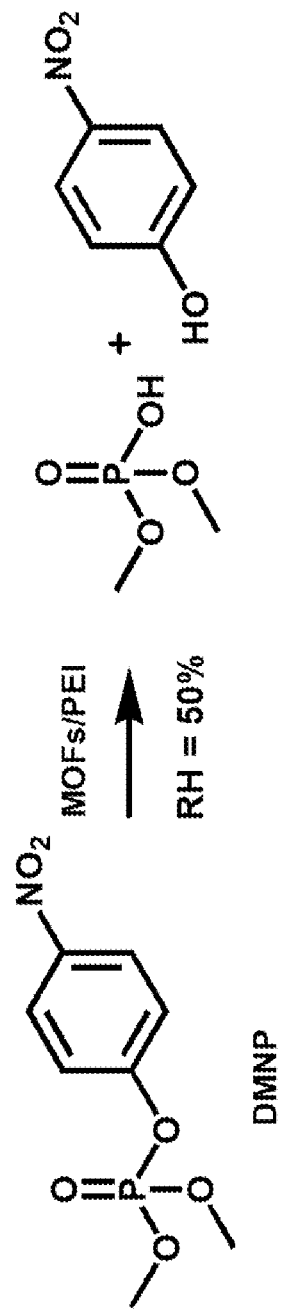
FIG. 1B
FIG. 1C

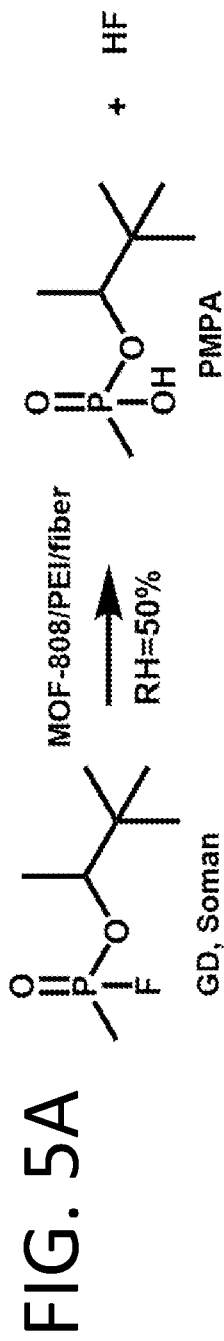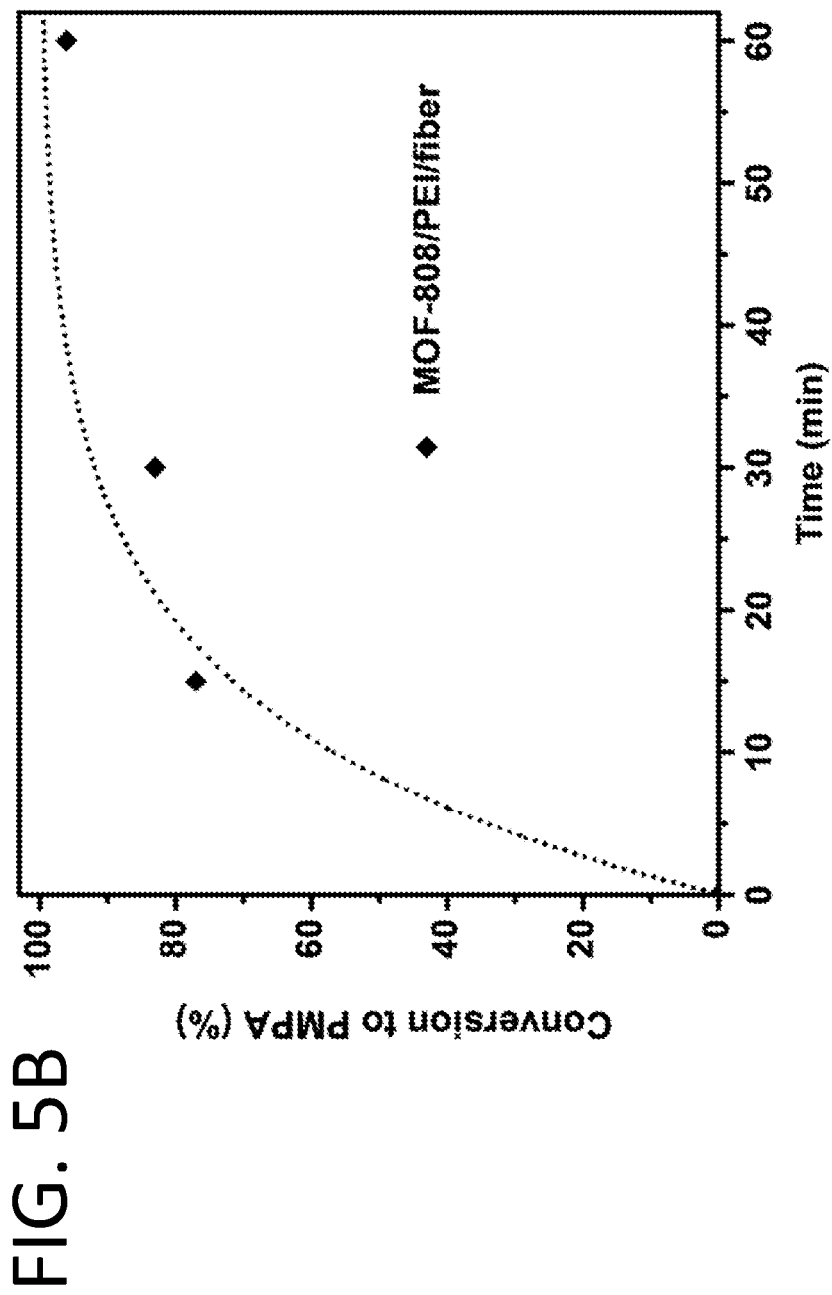
FIG. 5A
FIG. 5B

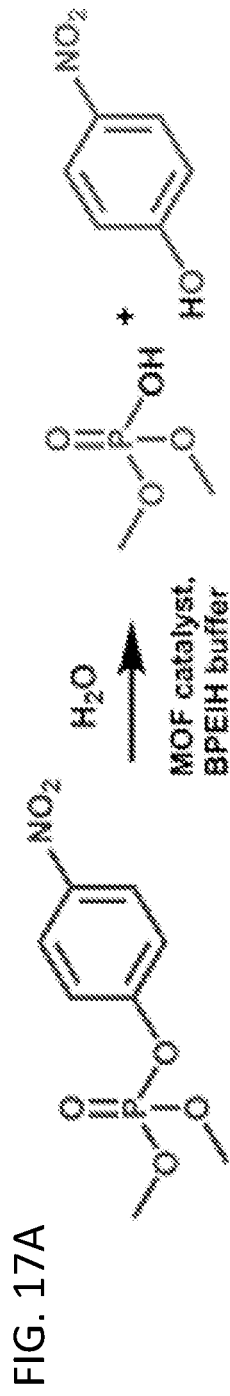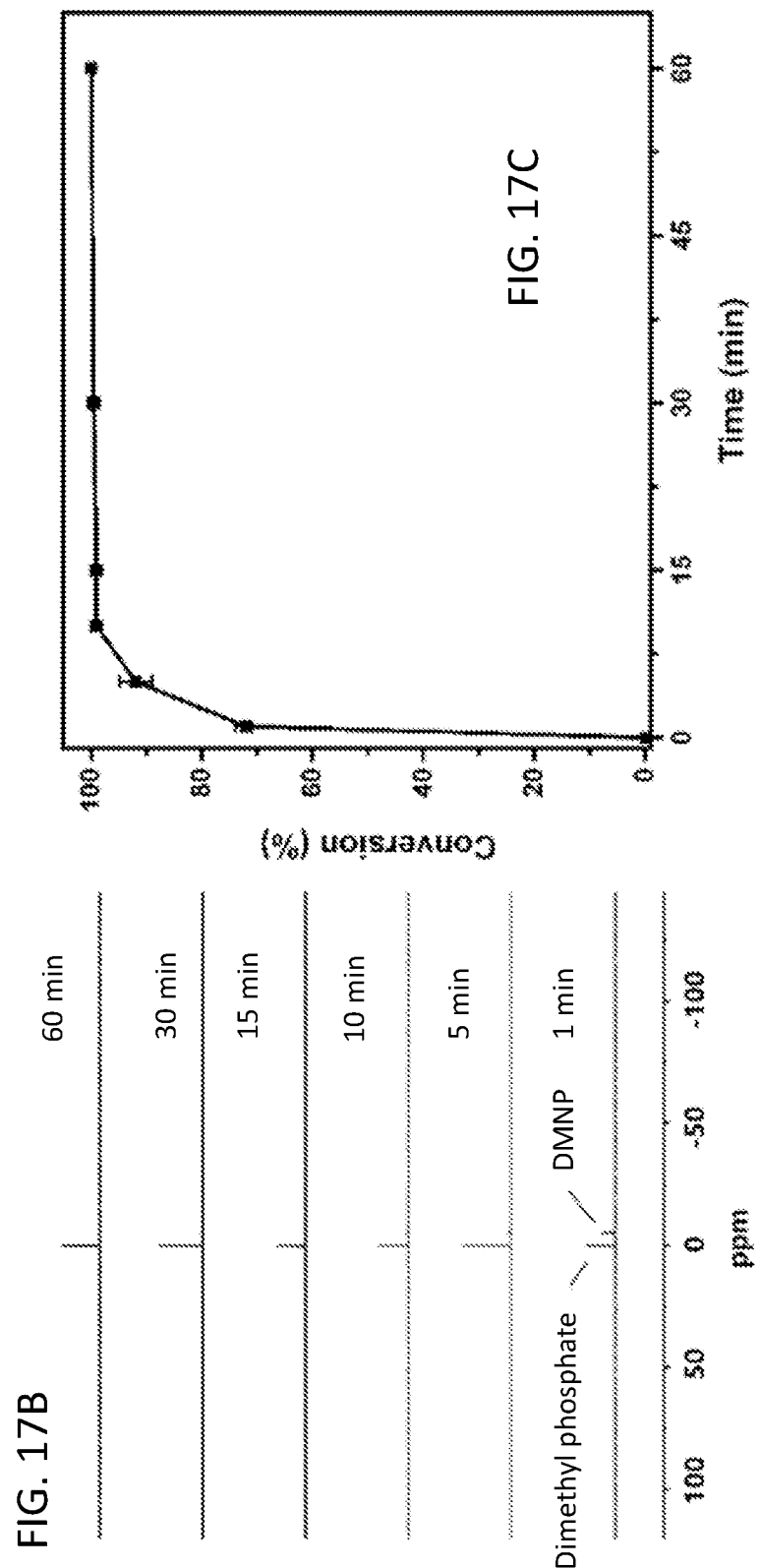
FIG. 17A
FIG. 17B
FIG. 17C

INTEGRATION OF METAL-ORGANIC FRAMEWORKS ON TEXTILE FIBERS AND FABRICS FOR THE DESTRUCTION OF NERVE AGENTS UNDER AMBIENT HUMIDITY CONDITIONS

CROSS-REFERENCE TO RELATED APPLICATIONS

The present application is a National Stage of International Application No. PCT/US20/62800, filed Dec. 2, 2020, which claims priority to U.S. provisional patent application No. 62/942,813 that was filed Dec. 3, 2019, the entire contents of both of which are incorporated herein by reference.

REFERENCE TO GOVERNMENT RIGHTS

This invention was made with government support under HDTRA1-18-1-0003 awarded by the Defense Threat Reduction Agency. The government has certain rights in the invention.

BACKGROUND

Detoxification of chemical warfare agents (CWAs) constitutes a challenging endeavor both societally and scientifically. Known for their acute toxicity, organophosphonate-based CWAs, known as nerve agents, serve as a serious threat to human welfare. Thus, the chemical neutralization of these harmful compounds to innocuous and benign chemicals is highly desirable, and the development of personal protective equipment against these agents is crucial. Current protective systems are composed of glass fibers for particulate capture, a blend of activated carbon for vapor uptake, and triethylenediamine (TEDA) with various metal oxides such as copper, chromium, and silver to react with agents. (Marrs, T. T. et al., John Wiley & Sons, 2007.) However, due to low uptake capacity, as well as slow reactivity and diffusion kinetics, this amorphous blend requires the use of large filtration swatches, which results in large cartridges affixed to designed face masks. Metal-organic frameworks (MOFs) have been explored as candidates for the catalytic hydrolysis of nerve agents and their simulants. Though highly efficient, bulk water and volatile bases are often required for hydrolysis with these MOF catalysts, hobbling real-world implementation.

SUMMARY

Textile fibers at least partially coated with a coating that includes MOFs and a polymeric base are provided. Also provided are fabrics formed from the textile fibers and methods of making and using the fibers and fabrics.

One embodiment of a textile fiber is at least partially coated with a composite comprising particles of metal-organic frameworks that are catalytic for the hydrolysis of an organophosphate compound dispersed in a matrix comprising a polymeric base. The polymeric base may be a hydrogel. The fiber may be formed into a woven or non-woven fabric, which may be used in protective gear, such as a filter in a face mask, or an article of clothing, such as a glove, a shoe, or a body suit.

One embodiment of a method using the coated fibers or fabrics is a method of disabling a toxic agent comprising an organophosphate compound with a hydrolysable bond. The method includes the step of exposing the organophosphate compound to a fabric coated with a composite comprising particles of metal-organic frameworks that are catalytic for the hydrolysis of the organophosphate compound dispersed in a matrix comprising a polymeric base in an atmosphere having a relative humidity in the range from 10% to 100%, wherein the metal-organic frameworks catalyze the hydrolysis of the hydrolysable bond in the presence of water vapor absorbed from the atmosphere.

One embodiment of a method of forming an article of clothing using the coated fabrics includes the steps of: applying a coating of a liquid solution comprising metal-organic frameworks that are catalytic for the hydrolysis of an organophosphate compound and a polymeric base to a fabric; drying the fabric to remove water and volatile components; and incorporating the dried fabric into an article of clothing.

BRIEF DESCRIPTION OF THE DRAWINGS

Illustrative embodiments of the invention will hereafter be described with reference to the accompanying drawings, wherein like numerals denote like elements.

FIG. 1B shows an illustration of MOF-808/PEI composites from vortex mixing of MOFs and grinded PEI particles. Atom color scheme of MOF-808 structure: C, light grey; Zr, grey; 0, black. H atoms are omitted for the sake of clarity. FIG. 1C shows a hydrolysis reaction of dimethyl 4-nitrophenyl phosphonate (DMNP), a nerve agent simulant with MOFs/PEI composites under RH=50%.

(FIG. 4A) Conversion profile and (FIG. 4B) tolerance to surrounds, including stirring in water for 24 h, after perspiration exposure, simulated $CO_2$-rich atmosphere, simulated gasoline-rich atmosphere, and after exposure to air for 100 days.

FIG. 5A shows a hydrolysis reaction of soman (GD) with MOF-808/PEI/fiber composites. FIG. 5B shows a solid-state conversion profile of a composite for the hydrolysis of soman under ambient conditions. Dotted lines correspond to first-order fits.

FIG. 17A shows a hydrolysis reaction of DMNP by a MOF/BPEIH composite catalyst. FIG. 17B shows $^{31}P$ NMR spectra of DMNP and its product. FIG. 17C shows the hydrolysis profile of DMNP conversion.

DETAILED DESCRIPTION

Figure 1A:
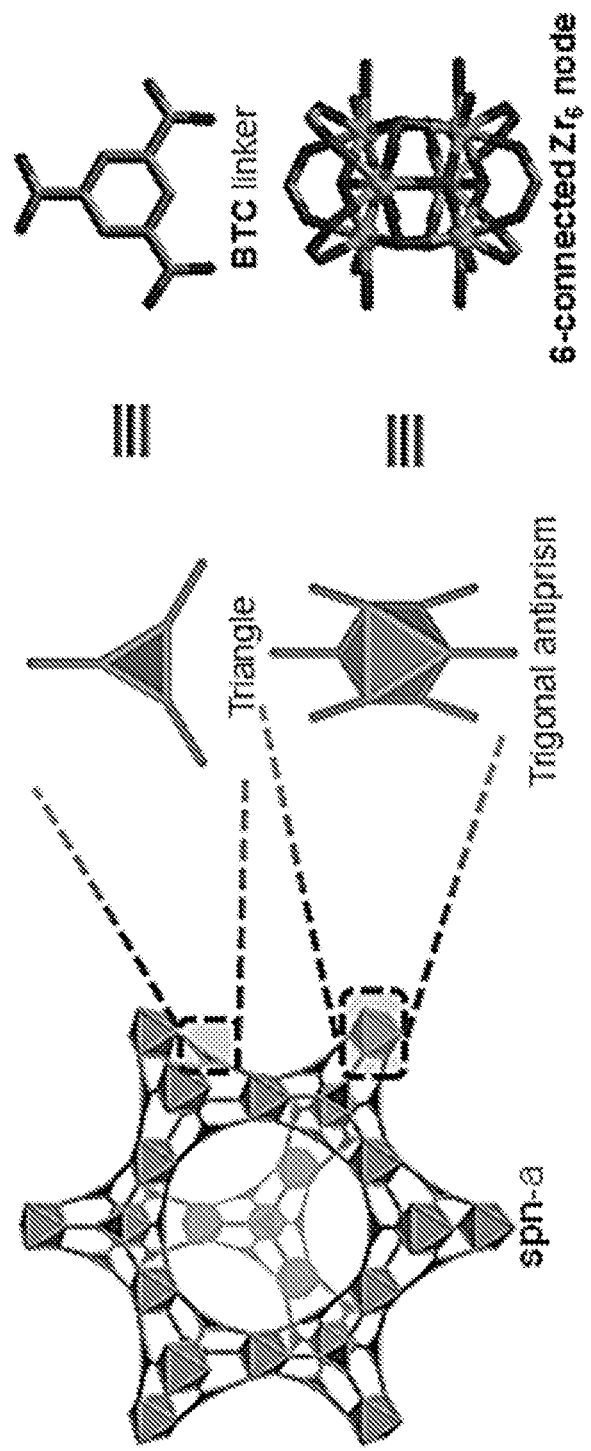
FIG. 1A shows a schematic representation of topology and structure of MOF-808 with the 3,6-connected spn net.

Textile fibers at least partially coated with a coating that includes MOFs and a polymeric base are provided. Also provided are fabrics formed from the textile fibers and methods of using the fibers and fabrics to catalyze the hydrolysis of organic molecules, such as nerve agents, pesticides, or other toxic chemical agents, having hydrolysable bonds.

The MOFs have Lewis acidic sites that are catalytically active for the hydrolysis of one or more organic compounds, such as organophosphonate compounds, including such compounds that are used as chemical warfare agents. The fibers and fabrics are able to hydrolyze the organophosphonate compounds in the presence of water vapor provided by ambient humidity conditions without the need to absorb condensed water into the fiber or fabric. As such, the fibers and fabrics can be incorporated into a variety of protective wearable articles, such as filters in face masks, gloves, and body suits, in practical settings, which can significantly reduce the dimensions of filters and increase the efficiency of the protective articles.

MOFs are hybrid, crystalline, porous compounds made from metal—ligand networks that include inorganic nodes connected by coordination bonds to multitopic organic linkers. The inorganic nodes (also referred to as vertices) in the framework include metal ions or clusters. (By convention, carboxylates or other linker terminal groups or atoms are often represented as components of the nodes.) Examples of MOFs that can be used for organic nerve agent hydrolysis include hexanuclear zirconium cluster-based MOFs (Zr-MOFs) with diverse pore geometries, pore sizes, and catalytically-active $Zr_6$ nodes. Descriptions of such MOFs can be found in Bai, Y. et al., *Chem. Soc. Rev.* 45, 2327-2367, (2016); Cavka, J. H. et al., *J. Am. Chem. Soc.* 130, 13850-13851, (2008); and Chen, Z. et al., *Coord. Chem. Rev.* 386, 32-49, (2019). Specific examples of suitable MOFs include, but are not limited to, those designated in the literature as MOF-808, UiO-66, UiO-66-$NH_2$, NU-1000, NU-901, NU-1601, and NU-1602. Information about the structures of these Zr-MOFs are provided in Table 1 and in Example 1.

TABLE 1

| MOF | Net (rcsr code) | Connectivity | Linker connectivity and shape | Cluster connectivity and shape | Ref. |
|---|---|---|---|---|---|
| NU-1601 | alb | 6, 12-c | 6-c, trigonal prism | 12-c, hexagonal prism (disordered) | 1 |
| NU-1602 | alb | 6, 12-c | 6-c, trigonal prism | 12-c, hexagonal prism (disordered) | 1 |
| UiO-66 | fcu | 12-c | 2-c, linear | 12-c, cuboctahedron | 2 |
| NU-901 | scu | 4, 8-c | 4-c, rectangle | 8-c, cube | 3 |
| NU-1000 | csq | 4, 8-c | 4-c, rectangle | 8-c, cube | 4 |
| MOF-808 | spn | 3, 6-c | 3-c, triangular | 6-c, trigonal antiprism | 5 |

The references recited in Table 1 are as follows: Ref. 1—Chen, Zhijie, et al., *Journal of the American Chemical Society* 141.31 (2019): 12229-12235; Ref 2—Cavka, J. H. et al., *J. Am. Chem. Soc.* 2008, 130, 13850-13851; Ref 3—Kung, C.-W. et al., *Chem. Mater.* 2013, 25, 5012-5017; Ref. 4—Mondloch, J. E. et al., *J. Am. Chem. Soc.* 2013, 135, 10294-10297; and Ref. 5—Peterson, G. W. et al., *J. Porous Mater.* 2014, 21, 121-126; Ref. 4—Feng, D. et al., *J. Am. Chem. Soc.* 2014, 136, 17714-17717; Ref. 5—Lyu, J. et al., *Chem. Sci.* 2019, 10, 1186-1192.

Typical MOF loadings in the coatings are in the range from about 1 mol. % to about 10 mol. %, including in the range from about 4 mol. % to about 8 mol. %. However, MOF loadings outside of these ranges can be used.

The polymeric bases are organic polymers that have Lewis acidic sites. In addition to promoting hydrolysis, the polymeric bases can act as a matrix in the coatings, binding the MOF particles and the fiber into a composite. Polyethylenimine (PEI), including linear PEI, branched PEI, and PEI dendrimers, can be used as the polymeric base in the coatings. Other suitable organic polymeric bases include poly(allylamine), poly(N-methylvinylamine), chitosan, and polydopamine. The polymeric bases can be homopolymers or copolymers. The polymeric bases may be non-crosslinked or crosslinked. In some embodiments of the coatings, crosslinked polymeric bases form a hydrogel. As used herein, the term hydrogel refers to a three-dimensional network formed from crosslinked polymer chains in which water fills voids between the polymer chains. The polymer chains that are crosslinked may be linear or branched chains. The use of hydrogels is advantageous because the hydrogels can serve as a water adsorbent in a humid environment. Additionally, while non-crosslinked polymeric bases may enter the pores of a MOF, thereby reducing the accessible surface area of MOFs, crosslinked hydrogel polymeric bases do not readily enter the MOF pores.

The coatings can be applied to a variety of fibers and fabrics, including fibers and fabrics made from natural polymers, such as cotton or cellulose, and synthetic fibers, such as nylon. The fibers can be used to form woven or non-woven fabrics that can be incorporated into a variety of articles made for human wear, including face masks, full body suits, pants, shirts, gloves, and/or footwear. The coatings can be applied to the fibers and/or fabrics using techniques such as dip coating, spray coating, spin coating, and the like.

The MOFs used in the fiber and fabric coatings can adsorb water vapor from the ambient environment with a steep uptake at or near room temperatures; for example, at temperatures in the range from about 20° C. to about 25° C., although the absorption can take place at temperatures outside of this range. Thus, the relative humidity (RH) available in many ambient settings is sufficient to provide a catalytically active fabric, without the need to contact the fabric with a bulk condensed water source which is absorbed into the fabric. As such, the fibers and fabrics described herein can be distinguished from previous methods of hydrolyzing organic nerve agents using a cotton or cellulose saturated with an aqueous basic solution of MOFs.

The specific RH range that is sufficient to enable the fibers and fabrics to hydrolyze the organic nerve agents will depend on the pore sizes, geometry, and chemical composition of the MOFs. By way of illustration, environments having an RH of at least 40%, including in the range from 50% to 85%, are effective at rendering the fibers and fabrics catalytically active toward the hydrolysis of the organic compounds. RH can be measured using a humidity sensor. Notably, although perspiration is not necessary to provide the MOFs with catalytic activity, the presence of perspiration is not harmful and can even be helpful.

The fibers and fabrics described herein can be exposed to a humid environment containing an organic compound having a hydrolysable bond, such as an organophosphonate molecule. Lewis acidic sites on the MOFs, such as Zr—OH—Zr sites, catalyze the hydrolysis of the organic compounds, thereby detoxifying them. The Lewis acidic sites provided by the polymeric bases then regenerate the Lewis acidic sites on the MOFs during the catalysis. Using the coatings described herein, organophosphates, including organophosphonates, can be converted into their hydrolyzed forms with conversion percentage, based on moles, of 60% or higher, 70% or higher, or 80% or higher, as illustrated in the Examples.

The coated fibers and fabrics can be made by dissolving the polymeric base in an organic solvent, such an alcohol, which may be non-aqueous, mixing the MOF into the solution, applying the resulting mixture to the fibers or fabrics, and drying the fibers or fabrics.

The toxic agents that can be disabled using the coated fibers and fabrics are chemical agents having at least hydrolysable bond that produce a harmful physiological reaction in a human or other animal. Examples of nerve agents that can be hydrolyzed include G and V series agents such as soman, sarin, tabun, cyclosarin and [2-(Diisopropylamino) ethyl]-O-ethyl methylphosphonothioate (VX).

EXAMPLES

Example 1

This example illustrates a generalizable and scalable approach for integrating MOFs and polymeric bases onto textile fibers for nerve agent hydrolysis. Importantly, the composite material described here showed similar reactivity under ambient conditions compared to a powder material in aqueous alkaline solution.

Figure 2A:
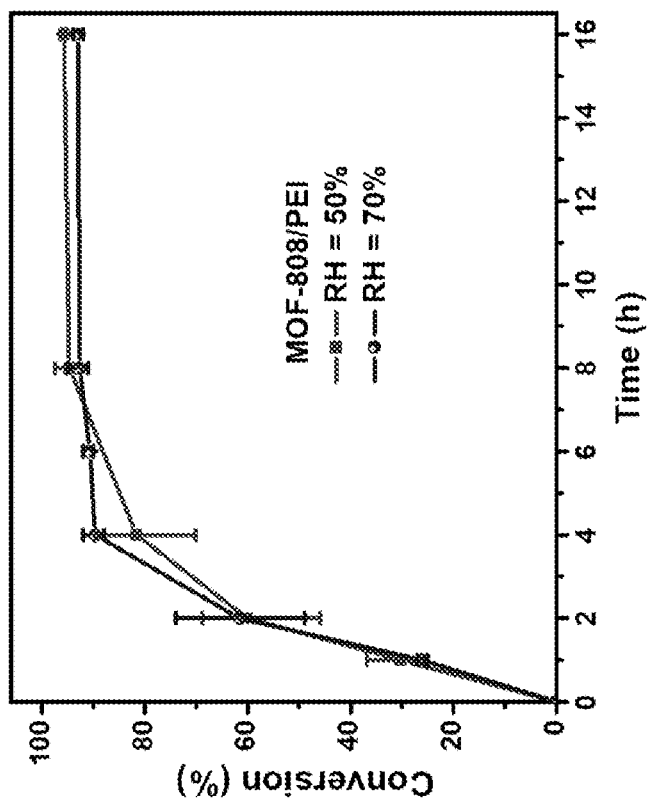
FIG. 2A shows water adsorption isotherms of UiO-66, UiO-66-$NH_2$, MOF-808, and NU-1000 at 298K.

The water vapor adsorption isotherms (FIG. 2A) of Zr-MOFs—UiO-66, UiO-66-$NH_2$, MOF-808, NU-1000—were measured at 298K after confirming phase purity and porosity of these materials. MOF-808 (Furukawa, H. et al., *J. Am. Chem. Soc.* 136, 4369-4381, (2014).), with a 3,6-connected spn net (spn symbolizes Spinel), is constructed from tritopic benzene-1,3,5-tricarboxylate (BTC) linkers and 6-connected $Zr_6$ nodes (FIG. 1A), and has shown remarkable hydrolysis activity with nerve agent simulants in liquid water in the presence of a volatile organic base: N-ethylmorpholine. (Moon, S.-Y. et al., *Angew. Chem. Int. Ed.* 54, 6795-6799, (2015).) From the water adsorption isotherms, the pores of UiO-66, UiO-66-$NH_2$, and MOF-808 can be saturated with water at RH=40% at 298 K, while NU-1000 reaches its saturation at RH=70% at 298 K. These data indicate potential to do catalytic hydrolysis with the former under ambient humidity (~50%) since the necessary water molecules for the hydrolysis reaction would be present inside the pores of the MOFs. The heterogenized polymeric base, linear polyethyleneimine (PEI), was targeted as the solid-phase base to regenerate Lewis acidic Zr sites during the catalysis.

Figure 2B:
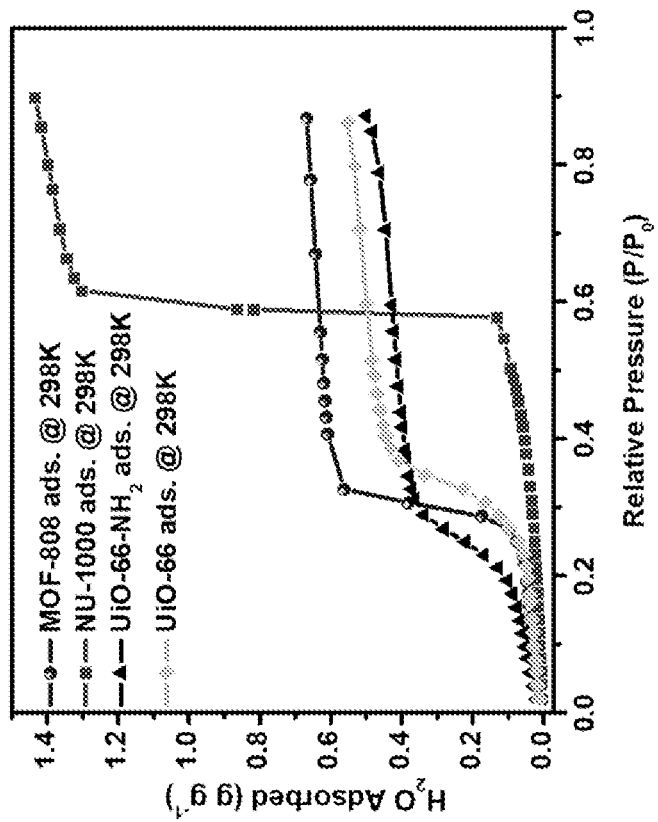
FIG. 2B shows a solid-state hydrolysis profile of DMNP with an MOF-808/PEI composite using 6 mol % catalyst loading under RH=50% and RH=70%.

The MOF/PEI composites were synthesized from simple vortex mixing of MOF powders and ground PEI particles (see the Methods for details). These materials displayed impressive catalytic performance under ambient humidity (RH=50%) towards the destruction of dimethyl 4-nitrophenyl phosphonate (DMNP), a nerve agent simulant. (FIG. 2B) This demonstrates the efficacy of MOFs for the hydrolysis of phosphate ester bonds under reasonable relative humidity. Among all studied MOFs/PEI composites with 6 mol % MOF loading, MOF-808/PEI (FIG. 1B) showed the highest activity (Table 2) in degrading DMNP at RH=50% (FIG. 1C). This can be attributed to the combined contribution of the following: (i) the large aperture of MOF-808 allows facile diffusion of reactants to the catalytic sites; (ii) 6-connected $Zr_6$ node as opposed to higher connectivities in the other MOFs; (iii) the pore can be filled with water at the RH=50%.

TABLE 2

The results of the hydrolysis of DMNP with MOFs or MOFs/PEI composites at various relative humidity.

| MOFs loading (6 mol %) | RH | Substrate (DMNP) | Product (DMP) | Product (M4NP) | Conversion (%) | Selectivity of DMP (%) | Yield of DMP (%) |
|---|---|---|---|---|---|---|---|
| MOF-808 | 50% | 6.89 | 1 | 0.08 | 14 | 93 | 13 |
| MOF-808/PEI | 50% | 0.68 | 1 | 0.29 | 65 | 78 | 51 |
| UiO-66 | 50% | 19.6 | 1 | 0 | 5 | 100 | 5 |
| UiO-66/PEI | 50% | 4.6 | 1 | 0.54 | 25 | 65 | 16 |
| UiO-66-$NH_2$ | 50% | 15 | 1 | 0 | 6 | 100 | 6 |
| UiO-66-$NH_2$/PEI | 50% | 7.6 | 1 | 1.1 | 22 | 48 | 10 |
| PEI | 50% | 1 | 0 | 0.14 | 12 | 0 | 0 |

TABLE 2-continued

The results of the hydrolysis of DMNP with MOFs or MOFs/PEI composites at various relative humidity.

| MOFs loading (6 mol %) | RH | Substrate (DMNP) | Product (DMP) | Product (M4NP) | Conversion (%) | Selectivity of DMP (%) | Yield of DMP (%) |
|---|---|---|---|---|---|---|---|
| NU-1000 | 50% | 19.1 | 1 | 0 | 5 | 100 | 5 |
| NU-1000/PEI | 50% | 6.02 | 1 | 0.78 | 23 | 56 | 13 |
| NU-1000/PEI | 85% | 3.19 | 1 | 0.89 | 37 | 53 | 20 |

Kinetic studies revealed an initial half-life of $t_{1/2}$=~1.6 h (turnover frequency, TOF=~5.2 $h^{-1}$) for hydrolysis of DMNP in the presence of the MOF-808/PEI composite (6 mol % catalyst loading) under RH=50%. It is also worth noting that there are MOF particles which were not in contact with DMNP due to the high viscosity of DMNP, which could lead to poor mixing. This, in turn, would lead to a slight underestimating of the catalytic activity. Additionally, it was observed that the RH at which the reaction is carried out can play a significant role in the catalytic activity, as it dictates the water amount available in the pores. For example, about a 60% enhancement in conversion of DMNP was observed for NU-1000/PEI when RH was increased from 50% to 85%—the water adsorption isotherm revealed that condensation happens at RH=~60% and 298 K. On the other hand, a slightly enhanced performance was observed for MOF-808/PEI composites towards hydrolyzing DMNP under RH=70% with $t_{1/2}$=~1.2 h and TOF=~7.0 $h^{-1}$, indicating that the effect of increasing humidity on the catalytic activity is limited after the pore filling RH is reached.

While the powder form of MOFs showed promising catalytic activity, their employment as protective layers requires the integration of these fine powders into existing gear. The resulting composite material needs to be reactive and impermeable to agents. To this end, air-permeable, flexible, and non-toxic textiles were employed as inexpensive and readily accessible supports for MOF/PEI composites. A gel-based dip-coating method was used to prepare a MOF/polymer coating on a flexible fiber.

Figure 3:
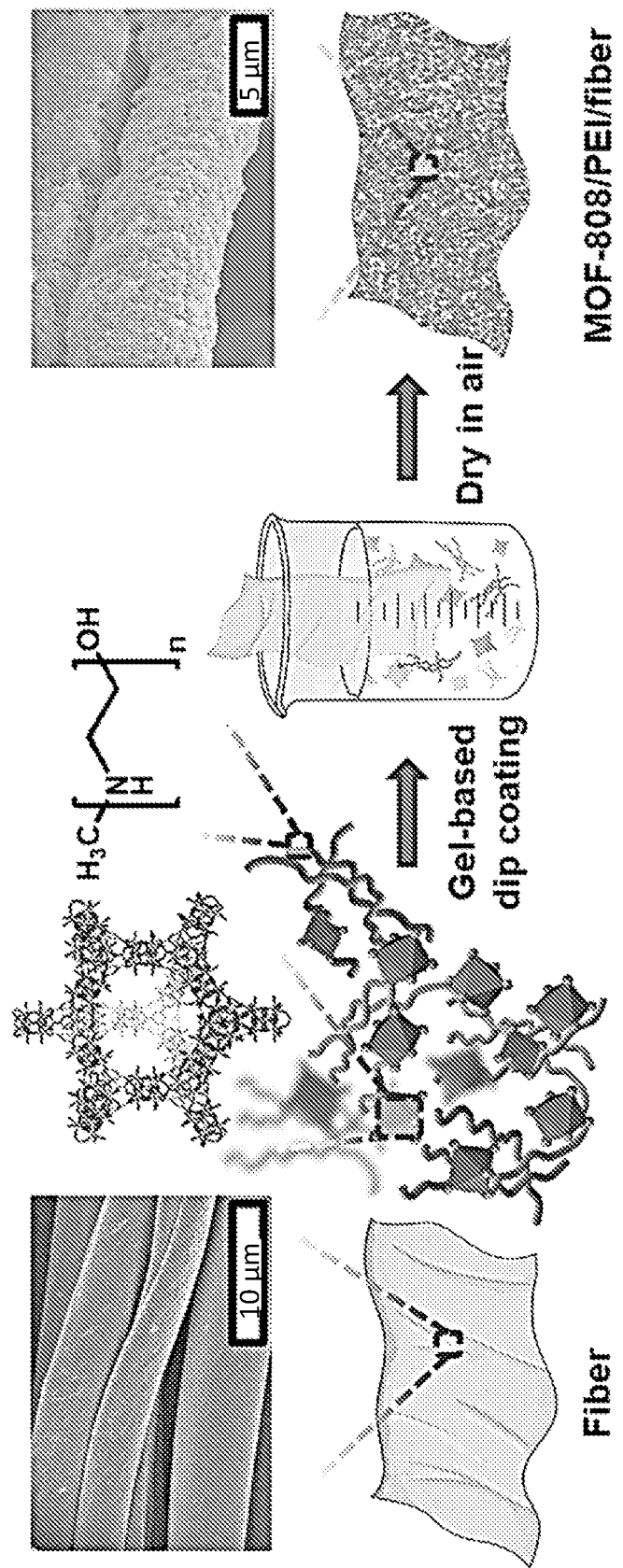
FIG. 3 shows a schematic illustration of the synthetic procedure of an MOF-808/PEI/fiber composite. Also shown are SEM images of cotton fiber (left) and MOF-808/PEI/fiber (right).
Figures 4A, 4B:
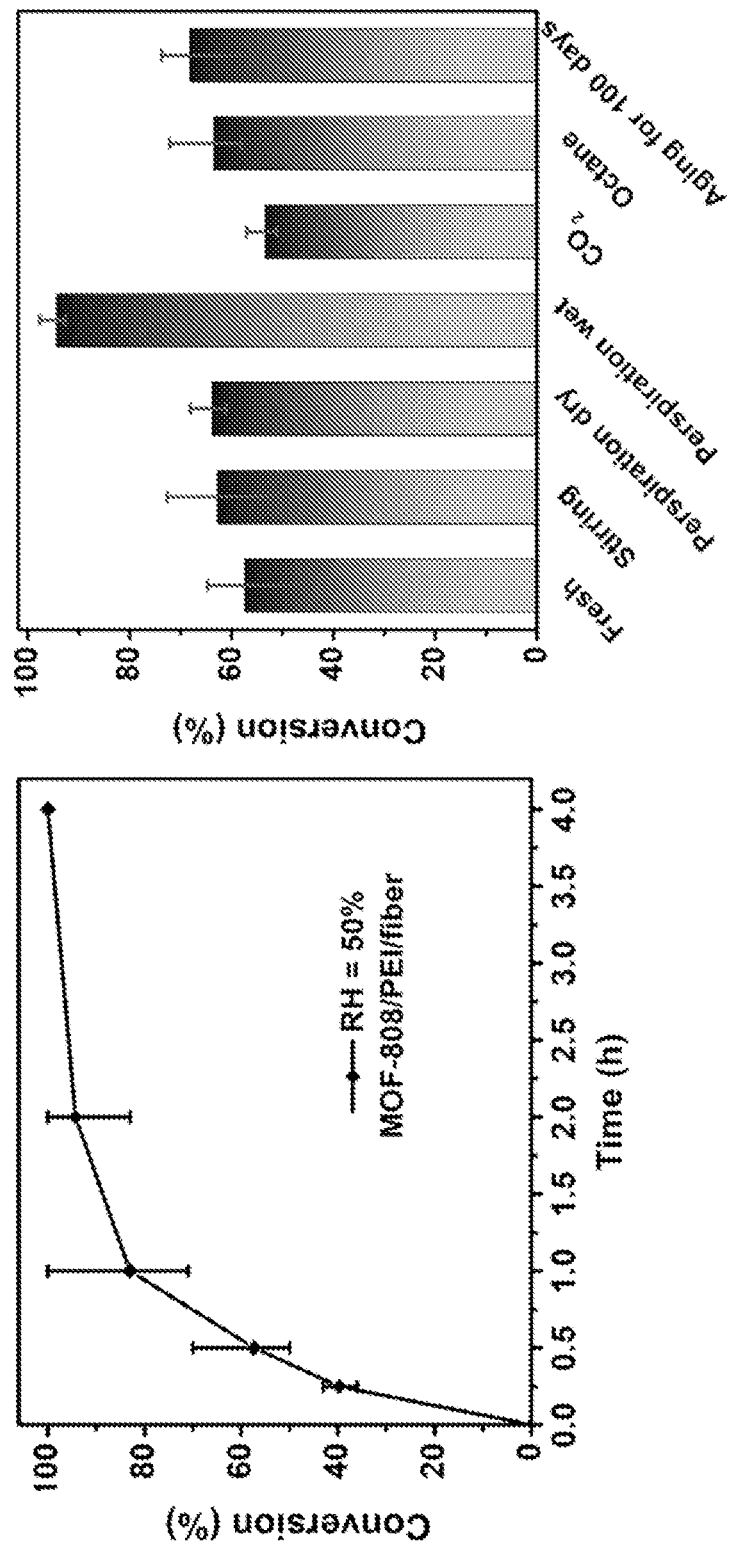
FIGS. 4A-4B show solid-state DMNP hydrolysis using an MOF-808/PEI/fiber composite.

Briefly, MOF-808 powders were dispersed in a PEI solution in methanol, which was used as a stock suspension for coating. After a dipping and drying process at room temperature (see Methods for more details), a dense and continuous MOF-808/PEI composite coating was obtained on the fiber with a mass loading of 12% (FIG. 3). The method reported here is highly scalable and inexpensive. The kinetic studies of the hydrolysis of DMNP with MOF/PEI/cotton fiber under RH=50% revealed that the initial half-life is rapid ($t_{1/2}$=~0.4 h) (FIGS. 4A-4B). The enhanced activity of the MOF/PEI/fiber system compared to MOF/PEI powder can be attributed to the highly uniform blend and dispersion of the MOF/PEI on the fiber surface, which could expose more catalytic sites compared to a physical mixture of powders.

With these promising simulant results, solid-state tests using the MOF-808/PEI/fiber composite were conducted on the nerve agent soman (GD) (FIGS. 5A-5B). Notably, the composite was even more reactive towards the nerve agent than the simulant, exhibiting a half-life of only 12 min (~0.2 h) and a rate constant of 5.0 $h^{-1}$ using a first order kinetic model. After only 1 h, GD was almost completely degraded to non-toxic pinacolyl methylphosphonic acid (PMPA).

High robustness and durability of the MOF-coated fiber is essential in practical applications, as the peeling or degradation of MOF particles could reduce the lifespan of a protective cloth. The adhesion of the composite MOF coating to cotton fiber was tested through agitation of the sample in water for 24 h. No notable loss of crystallinity was observed from PXRD patterns, and quantitative zirconium analysis by inductively coupled plasma optical emission spectroscopy (ICP-OES) showed that Zr content was nearly unchanged after vigorous stirring. Additionally, the composite's catalytic performance remained intact after drying in air at room temperature. The stability of the MOF-808/PEI/fiber composite was attributed to the low solubility of the PEI in water at room temperature, which can act as a binder. Shelf-life of the composite was also investigated. Strikingly, after storage in air for 100 days, the catalytic activity for DMNP hydrolysis was within the experimental error (conversion at 30 mins: as prepared: —57% vs. after 100 days: ~68%). The scalability of the current method was also demonstrated by preparing a large piece of textile composite (30 cm×30 cm), and the resulting composite material showed similarly high catalytic activity.

Under relevant conditions, a protective cloth is exposed to numerous other conditions aside from humidity, such as sweat, atmospheric $CO_2$, and diesel vapor from vehicles. The performance of the MOF-808/PEI/fiber composite was evaluated under simulated conditions. After adding 10 µL of artificial perspiration (pH=4.5) on the MOF-808/PEI/fiber composite (1 cm×1 cm), the catalytic conversion of DMNP at 0.5 h increased from 57% to 94% (FIG. 4A). After drying the sweated composites in air, the catalytic activity was comparable to that of a fresh sample, implying that the enhanced catalytic activity can be attributed to the water in the sweat. Additionally, the MOF-808/PEI/fiber composite material retained its catalytic activity after exposure to $CO_2$ and simulated diesel atmosphere (FIG. 4B).

A composite material composed of an MOF-808/PEI/fiber was developed, which showed high catalytic activity for the hydrolysis of a nerve agent under relevant conditions. Very importantly, despite utilizing only the water inside the pores of the MOF crystals, this composite material showed excellent activity for the hydrolysis of DMNP and GD. Durability tests affirmed the robustness of these textile materials under real-life atmospheres and conditions, corroborating their potential for incorporation into protective layers against CWAs.

Methods

Materials. All reagents were obtained from commercial sources and used without further purification, unless otherwise noted.

Hydrolysis of DMNP with MOFs/PEI composite under ambient humidity. Hydrolysis experiments were carried out at room temperature under different RH controlled by a humidified chamber. The MOF catalyst (1.5 µmol; corresponds to 6 mol % catalyst) and 17 mg PEI were transferred into a 2-dram vial. The MOFs/PEI composite was formed via vortex-mixing for 15 sec. DMNP (4 µL) was carefully added onto the composite with multiple contact spots and then swirled via vortex-mixing for 15 sec. The uncapped vial was left in the humidified chamber under specific RH for a recorded time before conduction digestion. To digest the sample for NMR, 0.7 mL of $D_2SO_4$/DMSO-$D_6$ (15/100 V/V) was added into the vial. The vial was sealed, whirled by vortex for 1 min, and was then transferred to an NMR tube for $^{31}$P NMR measurement.

Preparation of MOF-808/PEI/fiber composite. 5 g linear PEI was dissolved in 50 mL methanol under stirring to get a clear solution. 2.5 g of MOF-808 was added into PEI solution, which was stirred for 10 h to get a uniform suspension. A piece of cotton fabric (5 cm×5 cm) was immersed into the suspension for 10 min while stirring, and then it was taken out from suspension to rest on aluminum foil overnight inside the fume hood to dry. This suspension could be used for preparation of at least 15 pieces of the same size composite material.

Hydrolysis of DMNP with MOF-808/PEI/Fiber Under Ambient Humidity.

Hydrolysis experiments on MOF-808/PEI/fiber were carried out similar to experiments on the MOF/PEI composite at room temperature under different RH controlled by a humidified chamber. DMNP (4 µL) was carefully added onto the center of the MOF-808/PEI/fiber composite (1 cm×1 cm) in an uncapped vial, and then the chamber was set at 50% humidity for a recorded time. The sample digestion and $^{31}$P NMR measurement were the same as those for the MOF-808/PEI composite.

Hydrolysis of Soman (GD) with MOF-808/PEI/Fiber Under Ambient Humidity.

Caution! Experiments should be run by trained personnel using appropriate safety procedures. Hydrolysis experiments were carried out on composite materials at room temperature using a procedure similar to DMNP experiments. Samples were prehumidified at 50% RH for ~16 h, after which 2.4 µL of GD was added dropwise to the composite. After 15, 30, and 60 min, 900 µL of DMSO-$D_6$ was added followed by vortexing. Immediately after vortexing, 100 µL of 50% HF was added to the solution. After 30 min, the solution was vortexed and transferred to the NMR reaction tube and monitored for GD and PMPA using $^{31}$P NMR. Background data were collected by first digesting the MOF-808/PEI/cotton composite in HF/DMSO-$D_6$ followed by GD spiking to ensure no homogeneous reactivity occurred in solution between digestion and NMR analysis.

Stability Test on MOF-808/PEI/Fiber Composite.

To test the catalytic performance of the samples under $CO_2$ and simulated gasoline atmosphere, 50 mg of dry ice or 100 µL of octane was added in the incubation chamber. After standing for 1 h to gasify the dry ice and octane, the MOF-808/PEI/fiber composite (1 cm×1 cm) loaded with DMNP (4 µL) was put into the chamber at 50% humidity for a recorded time. The sample digestion and $^{31}$P NMR measurement were similar to those from the MOF-808/PEI/fiber. To test the catalytic performance of the samples after perspiration exposure, 10 µL of artificial perspiration (pH=4.5) was added in the center of the MOF-808/PEI/fiber composite (1 cm×1 cm), and DMNP (4 µL) was dropped in the center of the MOF-808/PEI/fiber composite for catalytic testing. The dried sample after perspiration addition was also tested using the same method. The MOF-808/PEI/cotton sample after stirring in water (400 rpm) for 24 h and drying or exposure to air for 100 days was also tested in solid-state hydrolysis.

Scaled up coating MOF-808/PEI composite layer on fiber. 20 g linear PEI was dissolved in 200 mL methanol under stirring to get a clear suspension. 10 g of MOF-808 was added into PEI solution, which was stirred for 10 h to get a uniform suspension. A piece of cotton fabric (30 cm×30 cm) was immersed into the suspension for 10 min and then taken out from suspension. The wet fabric with 200% liquid pick-up was carefully put on aluminum foil and dried in a hood overnight.

Additional Experimental Details

X-Ray Diffraction Analyses. Powder X-ray diffraction (PXRD) of MOFs was measured at room temperature on a STOE-STADIMP powder diffractometer equipped with an asymmetric curved Germanium monochromator (CuKα1 radiation, λ=1.54056 Å) and one-dimensional silicon strip detector (MYTHEN2 1K from DECTRIS). The line focused Cu X-ray tube was operated at 40 kV and 40 mA. The activated powder was sandwiched between two Kapton foils and measured in transmission geometry in a rotating holder. Intensity data from 1 to 30 degrees two theta were collected over a period of 6 minutes. The instrument was calibrated against a NIST Silicon standard (640d) prior to the measurement.

$N_2$ Sorption Measurements. $N_2$ adsorption and desorption isotherms on activated materials were measured at Northwestern University on a TriStar (Micromeritics) instrument at 77 K. Activation of MOFs was performed under a dynamic vacuum for 12 h on SVP at 120° C. (2° C./min).

Scanning electron micrographs (SEM) images were taken using a Hitachi SU8030 at the EPIC facility (NUANCE Center-Northwestern University). Activated samples were coated with $OsO_4$(~9 nm thickness) in a Denton Desk III TSC Sputter Coater before imaging.

Nuclear magnetic resonance (NMR). $^{13}$C and $^1$H NMR spectra were recorded on a Bruker Avance III 500 with working frequency of 500 MHz. The phosphorous NMR was recorded on a Bruker Avance III HD X500 system equipped with a TXO Prodigy probe. Chemical shifts were reported in ppm relative to the signals corresponding to the residual non-deuterated solvents ($CDCl_3$-d: δ 7.26 ppm for $^1$H NMR, 77.16 ppm for $^{13}$C NMR, DMSO-$d_6$: δ 2.50 ppm for $^1$H NMR, DMSO-$d_6$: δ 37.65 ppm for $^{13}$C NMR). Spectra were analyzed with Mestrallova software (Version 12.0).

MOF loading determination. Mass loadings of MOF-808 on fiber were calculated based on ICP-OES analysis. ICP-OES was tested using an iCAP™ 7600 ICP-OES Analyzer (Thermo Scientific™) over the 166-847 nm spectral range. Before ICP-OES testing, all fibrous samples were dried in a vacuum oven overnight at 100° C. Typically, 100 mg of composite was quickly weighed and digested in 10 mL $HNO_3$. 100 µL of the above solution was diluted into 10 mL using Milli-Q water for testing the Zr concentration using the ICP-OES method. The mass loading (ML) was calculated from the following equation: ML=(C×100×0.01 L)/(100 mg×$W_{Zr}$)×100%, where C is the concentration of Zr in the diluted nitric acid solution measured by ICP-OES, expressed in mg/L. 100 is the dilution factor, and 0.01 L is the volume of concentrated $HNO_3$ used in digestion of the fiber composite. $W_{Zr}$ is the mass percentage of MOFs: 35.3% for MOF-808.

Water Sorption Measurements. Water isotherms were measured on a Micromeritics 3Flex, and the water uptake in g g$^{-1}$ units was calculated as [(adsorbed amount of water)/(amount of adsorbent)]. Prior to the water adsorption measurements, water (analyte) was degassed by freeze-pump-thaw cycling using liquid nitrogen until the saturation pressure of water at a given temperature was achieved. The temperature of the sample tube was controlled with a Micromeritics Isocontroller. Activation of MOFs was performed under a dynamic vacuum for 12 h on SVP at 120° C. (2° C./min).

Synthesis of MOFs

Synthesis of NU-1000

NU-1000 was synthesized according to a previous procedure. (Islamoglu, T. et al., *CrystEngComm* 20, 5913-5918, (2018).) ZrOCl$_2$.8H$_2$O (98 mg, 0.30 mmol) and benzoic acid (2 g, 16.38 mmol) were mixed in 8 mL of DMF in an 8-dram vial and ultrasonically dissolved. The clear solution was incubated in an oven at 100° C. for 1 h. After cooling down to room temperature, H$_4$TBAPy (40 mg, 0.06 mmol) and trifluoroacetic acid (TFA) (40 µL, 0.52 mmol) were added and sonicated for 10 min. The yellow suspension was placed in a preheated oven at 100° C. for 18 h. After cooling down to room temperature, yellow polycrystalline material was isolated by centrifuge (5 min, 7500 rpm) and washed with N,N-dimethylformamide (DMF) three times (15 mL each) (soaked ~1 h between washes). An HCl washing step was performed as follows to remove coordinated modulator from the node. The resulting yellow powder was suspended in 12 mL DMF and 0.5 mL of 8 M aqueous HCl was added. This mixture was heated in an oven at 100° C. for 18 h. After cooling to room temperature, the powder was isolated by centrifugation and washed with DMF three times (15 mL each) and acetone three times (15 mL each) (soaked ~1 h between washes) and soaked in acetone for an additional 16 h. NU-1000 crystals were collected by centrifugation and dried in a vacuum oven at 80° C. for 1 h and then activated with Micromeritics Smart VacPrep under vacuum at 120° C. for 18 h.

Synthesis of UiO-66

Defective UiO-66 was synthesized according to a previous procedure. (Islamoglu, T. et al., *Inorg. Chem.* 57, 13246-13251, (2018).) ZrCl$_4$ (125 mg, 0.54 mmol), 1,4-benzene dicarboxylic acid (123 mg, 0.75 mmol), and 15 ml of DMF were placed in an 8-dram vial and sonicated until the solution was completely dissolved. 1 mL of concentrated HCl (12 M) was added to the solution, and the solution was further sonicated for 5 min. The resultant mixture was placed at 80° C. in a preheated oven overnight. After the material was cooled to room temperature, the product was collected by centrifugation. The material was washed with 15 mL of DMF (3 times) and 15 mL of acetone (3 times) and finally soaked in 15 mL of acetone overnight. The resulting material was dried in a vacuum oven at 80° C. for 1 h and then activated with Micromeritics Smart VacPrep under vacuum at 120° C. for 18 h.

Synthesis of UiO-66-NH$_2$

UiO-66-NH$_2$ was synthesized according to a previous procedure. (Islamoglu, T. et al., *Angew. Chem. Int. Ed.* 57, 1949-1953, (2018).) An 8-dram vial was loaded with ZrCl$_4$ (0.27 mmol, 67 mg), 2-aminoterephthalic acid (0.38 mmol; 69 mg), and 15 mL DMF and sonicated until fully dissolved, then 0.5 mL of conc. HCl was added to the reaction mixture and sonicated for an additional minute and heated at 80° C. for 18 h. The resulting solid was then centrifuged and washed first with DMF and then with abs EtOH and finally soaked in EtOH overnight to solvent exchange residual DMF. The resulting material was dried in a vacuum oven at 80° C. for 1 h and then activated with Micromeritics Smart VacPrep under vacuum at 120° C. for 18 h.

Synthesis of MOF-808 microcrystals

MOF-808 was synthesized according to a previous procedure with slight modifications. (Drout, R. J. et al., *CrystEngComm* 20, 6140-6145, (2018).) ZrOCl$_2$.8H$_2$O (2 g, 6.2 mmol) and 1,3,5-benzenetricarboxylic acid (H$_3$BTC; 1.5 g, 7.1 mmol) were added to a glass Pyrex bottle. To this, 284 mL of DMF and 284 mL of formic acid were added. The solution was cooled to room temperature and sonicated to ensure homogeneity of the solution. The bottle was then heated at 120° C. for 48 hours in a preheated oven. After removal from the oven and cooling to room temperature, the material was washed with copious amounts of DMF through multiple cycles of centrifugation/decantation, and the solvent was exchanged to acetone to soak overnight. The material was then washed with copious amounts of acetone through multiple cycles of centrifugation/decantation. The material was then dried in a vacuum oven at 85° C. for two hours. It was then suspended in 284 mL of 0.1 M aqueous hydrochloric acid and soaked at room temperature overnight. The material was then washed with copious amounts of deionized water through multiple cycles of centrifugation/decantation and with copious amounts of acetone through multiple cycles of centrifugation/decantation. The material was soaked in acetone overnight. It was then initially dried in a preheated vacuum oven at 85° C. before activation under ultra-high vacuum on a SmartVacPrep (SVP) at 120° C. overnight.

Synthesis of MOF-808 Nanoparticles

MOF-808 nanoparticles used in gel-based coating were prepared using a published procedure with slight modifications. (Jiang, J. et al., *J. Am. Chem. Soc.* 136, 12844-12847, (2014).) H$_3$BTC (4.2 g, 20 mmol) and ZrOCl$_2$.8H$_2$O (6.4 g, 20 mmol) were dissolved in DMF/formic acid (300 mL/300 mL) and placed in a 2-L screw-capped glass jar, which was heated to 120° C. for 24 h. White powder was collected by centrifugation (8000 rpm for 10 min) and washed with 200 mL of fresh DMF three times and with 200 mL of fresh acetone three times. As-synthesized MOF-808 nanoparticles were then immersed in 200 mL of anhydrous acetone for three days, during which time the acetone was replaced every day. The acetone-washed sample was then evacuated at 80° C. for 24 h and at 120° C. for 24 h to get an activated sample (3.5 g).

Synthesis of DMNP and M4NP

Procedure for the synthesis of dimethyl(4-nitrophenyl) phosphate (DMNP). (Islamoglu, T. et al., *Chem. Mater.* 29, 2672-2675, (2017).)

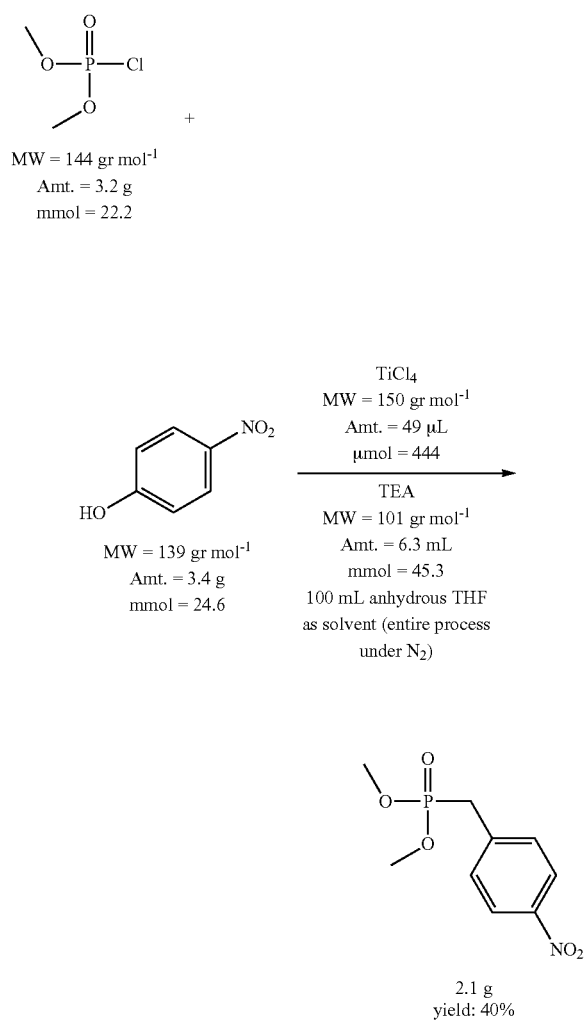

2.1 g
yield: 40%

4-nitrophenol (3.4 g) at room temperature under argon atmosphere was added to a magnetically stirring solution of TiCl$_4$ (49 µL) in 80 mL anhydrous THF in a 250 mL Schlenk flask. A solution of dimethylchlorophosphate (3.2 g) in 20 mL anhydrous THF was added using a gas tight syringe followed by distilled triethylamine (6.3 mL). The resulting mixture was allowed to stir for 2 hrs at room temperature (~23° C.). The resulting yellow solution was quenched with water and extracted with EtOAc (three times). The combined organics were dried over NaSO$_4$, filtered, and concentrated under reduced pressure. The resulting slight yellowish oily crude product was purified using a silica gel column with eluent of EtOAc:Hexanes (1:1).

NMR spectra of DMNP were recorded on a Bruker Avance III 500 with working frequency of 500 MHz. Chemical shifts were reported in ppm relative to the signals corresponding to the residual non-deuterated solvents (CDCl$_3$: δ 7.26 ppm for $^1$H NMR, 77.16 ppm for $^{13}$C NMR).

$^1$H NMR (500 MHz, Chloroform-d) δ 8.09 (d, J=9.2 Hz, 2H), 7.25 (d, J=9.2 Hz, 2H), 3.77 (d, J=11.5 Hz, 6H). $^{13}$C NMR (126 MHz, Chloroform-d) δ 155.32, 155.27, 144.65, 125.61, 120.49, 120.45, 77.49, 77.24, 76.98, 55.25, 55.20.

The product can be handled in air; however, it should be kept in the fridge under argon to prevent hydrolysis by moisture for long-term storage. Caution: Dimethylchlorophosphate and dimethyl(4-nitrophenyl)phosphate are highly toxic and must be handled carefully in a fumehood.

Procedure for the Synthesis of Methyl 4-Nitrophenyl Phosphate (M4NP)

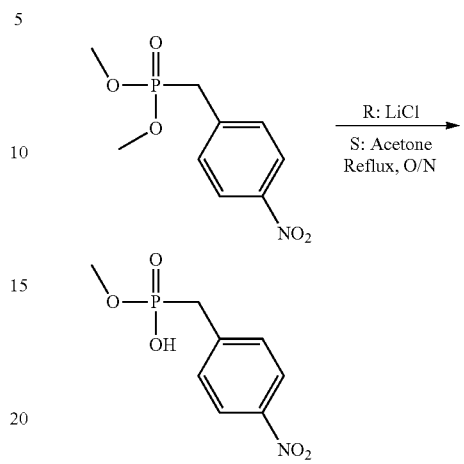

This procedure is slightly modified from the literature. (van Loo, B. et al., *J. Am. Chem. Soc.* 141, 370-387, (2019).) DMNP (1.0 g) was dissolved in 75 mL acetone followed by the addition of lithium chloride (0.2 g, 0.005 mol). The stirring mixture was heated to reflux overnight, followed by removal of the volatiles under reduced pressure to give an off-white solid residue. The residue was taken up in 20 mL H$_2$O, and the aqueous solution was extracted with 2×20 mL diethyl ether. The aqueous layer was acidified by adding 20 mL of concentrated HCl, and the acidic mixture was extracted with 3×50 mL diethyl ether. The combined organic layers were dried over MgSO$_4$, and the solvent was evaporated to give the acid form of the desired compound as a white solid. Yield: 0.25 g (25%). Caution: the product is highly toxic.

$^1$H NMR (500 MHz, Chloroform-d) δ 8.22 (d, J=9.1 Hz, 2H), 7.32 (d, J=8.1 Hz, 2H), 6.47 (s, 1H), 3.85 (d, J=11.6 Hz, 3H). $^{13}$C NMR (126 MHz, Chloroform-d) δ 154.98, 154.93, 144.96, 125.72, 120.69, 120.65, 77.27, 77.01, 76.76, 55.26, 55.21. $^{31}$P NMR (202 MHz, Chloroform-d) 6-4.63 (q, J=11.9 Hz).

Additional Supporting Information

Figure 6:
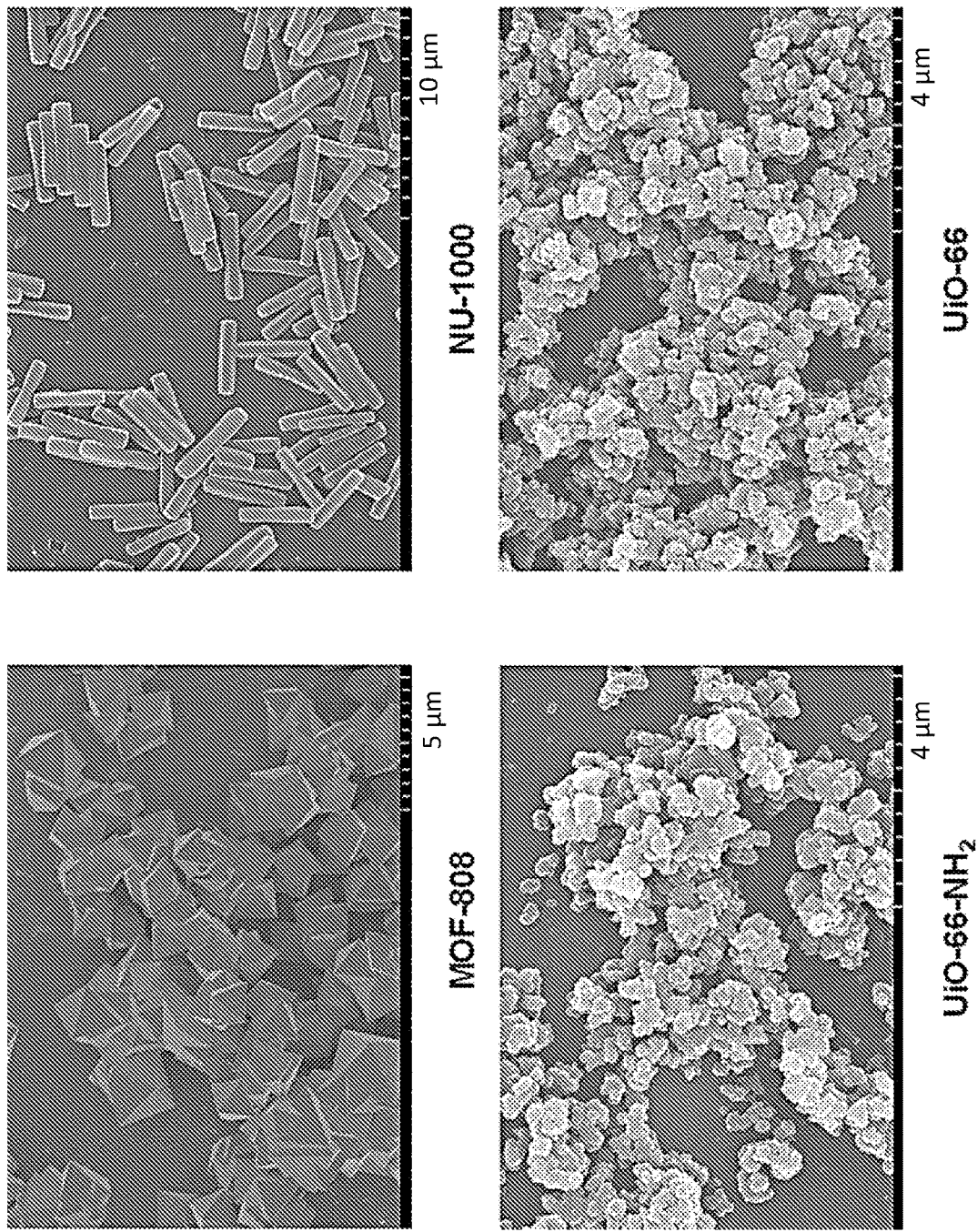
FIG. 6 shows SEM images of MOF-808, NU-1000, UiO-66-$NH_2$ and UiO-66.
Figure 7:
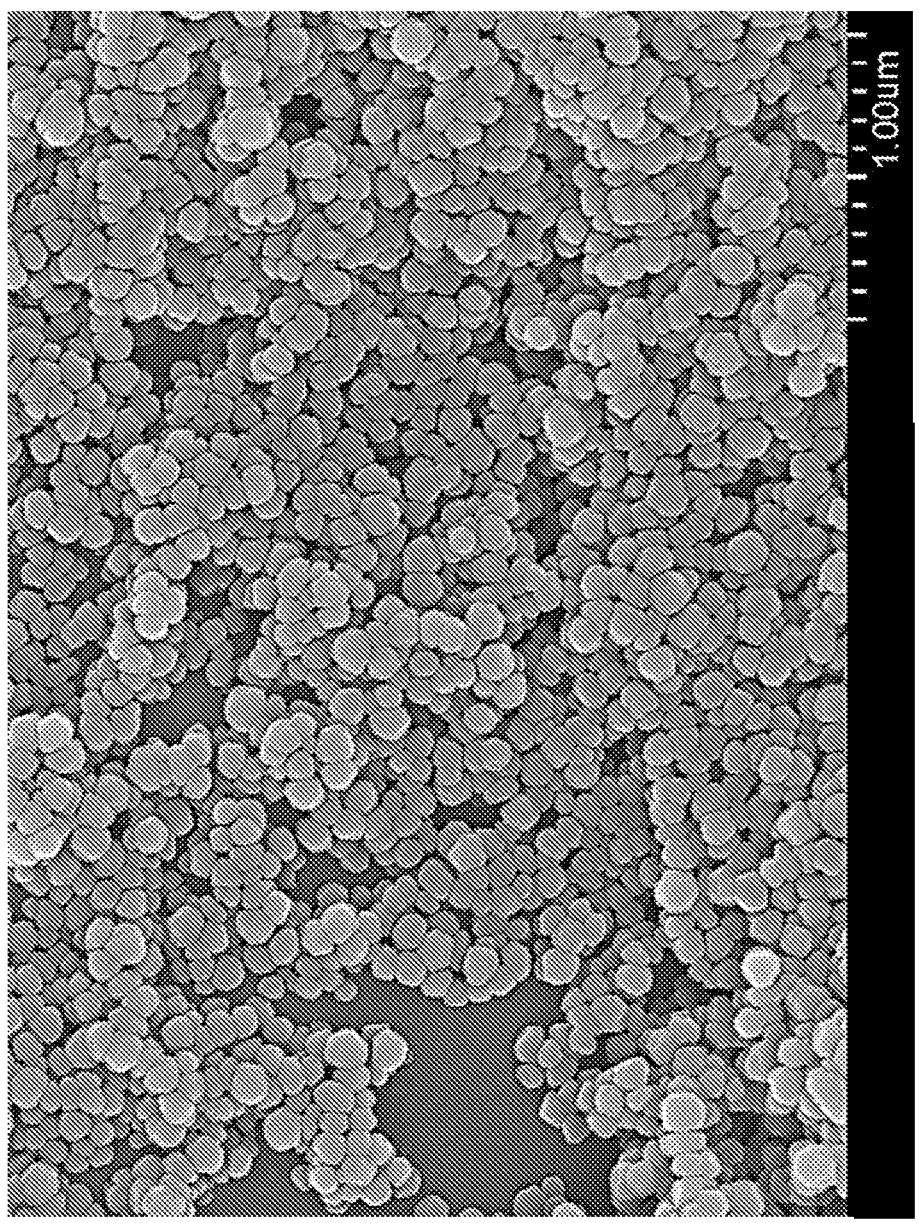
FIG. 7 shows a SEM image of MOF-808 nanoparticles used for the MOF-808/PEI/cotton fiber composite using gel-based coating methods.
Figure 8:
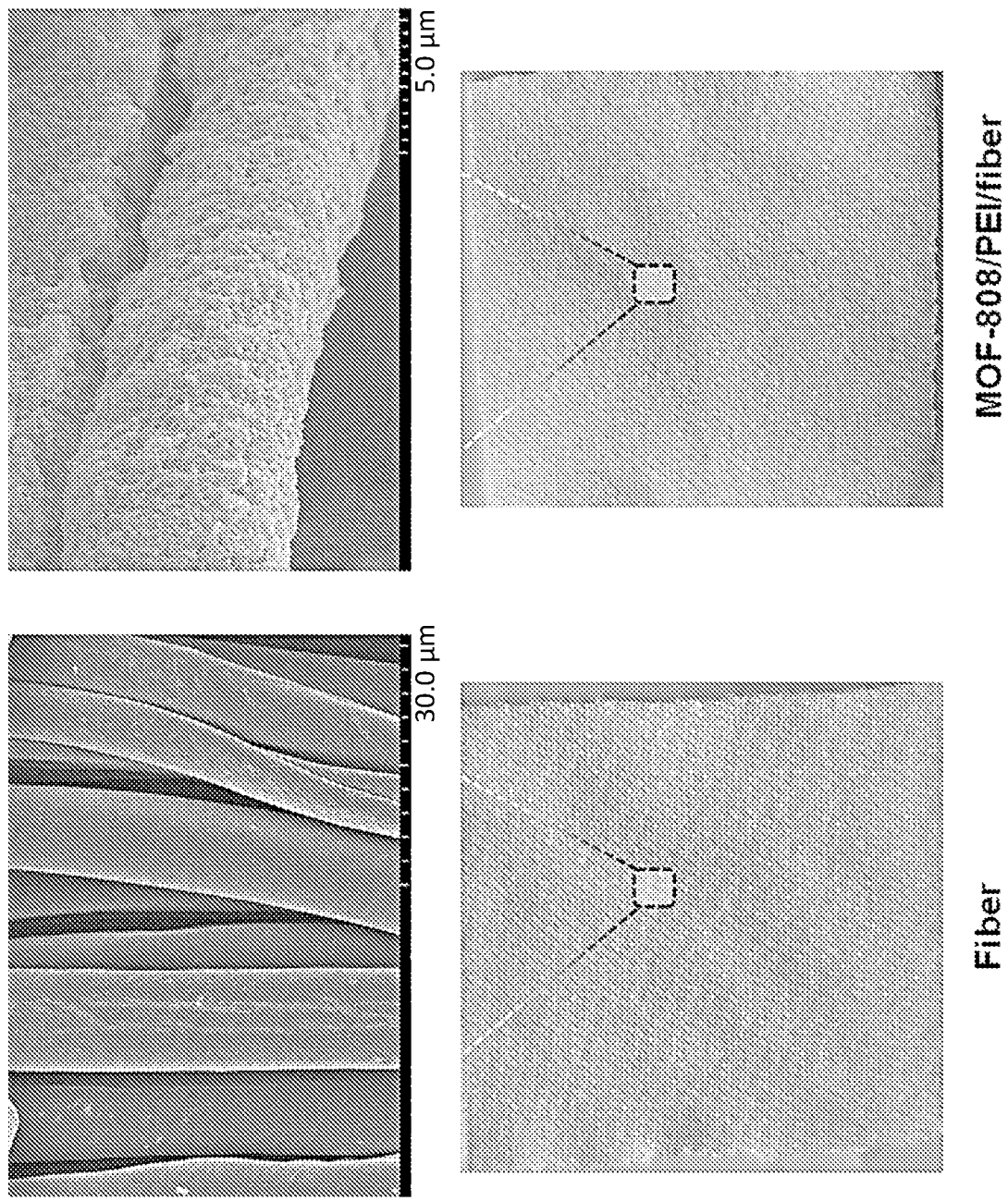
FIG. 8 shows SEM and optical images of cotton fiber and MOF-808/PEI/fiber.

Scanning Electron Microscope Images. FIG. 6 shows SEM images of MOF-808, NU-1000, UiO-66-NH$_2$ and UiO-66. FIG. 7 shows a SEM image of MOF-808 nanoparticles used for the MOF-808/PEI/cotton fiber composite using gel-based coating methods. FIG. 8 shows SEM and optical images of cotton fiber and MOF-808/PEI/fiber.

Figure 9:
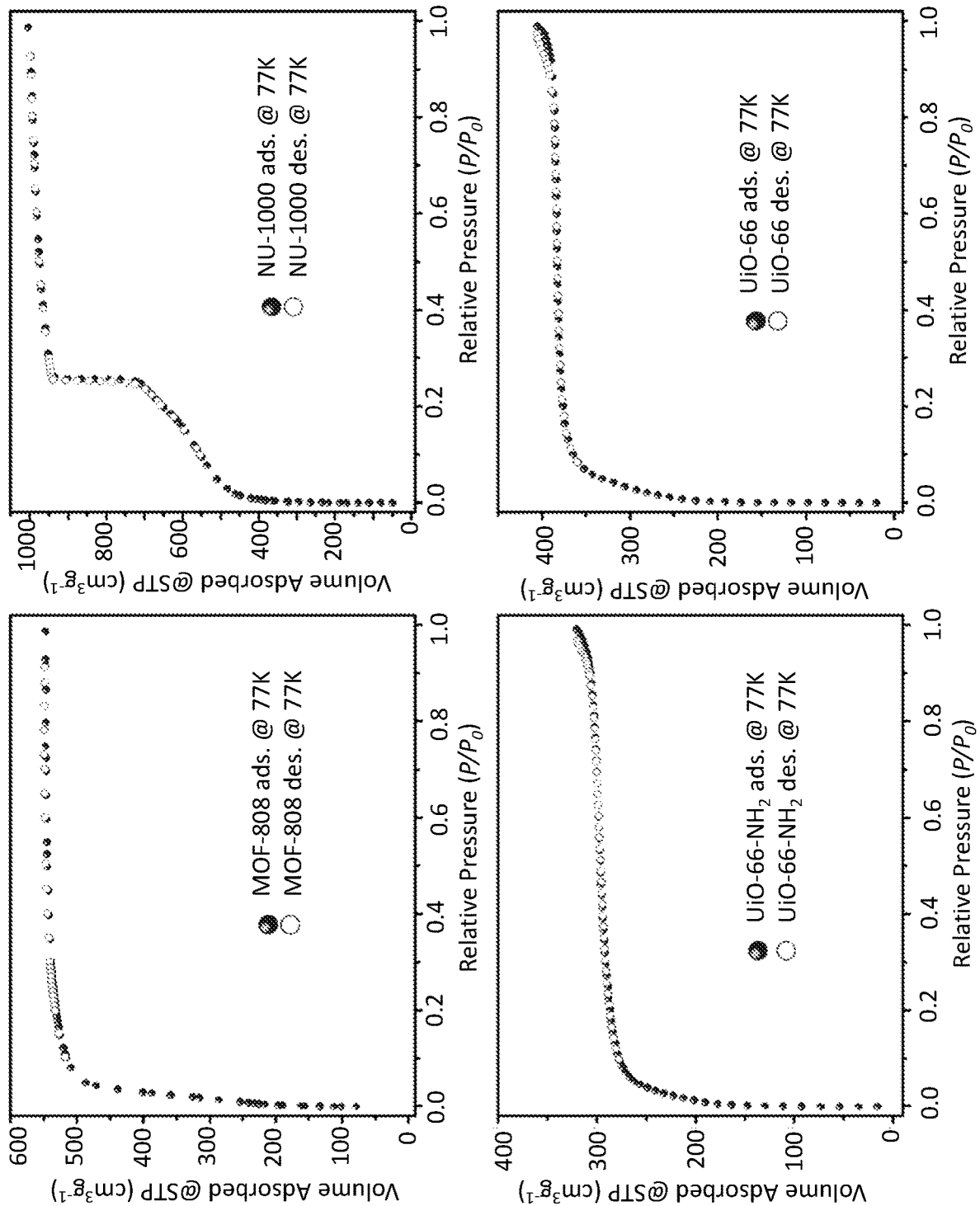
FIG. 9 shows $N_2$ sorption isotherms of MOF-808, NU-1000, UiO-66-$NH_2$ and UiO-66.
Figure 10:
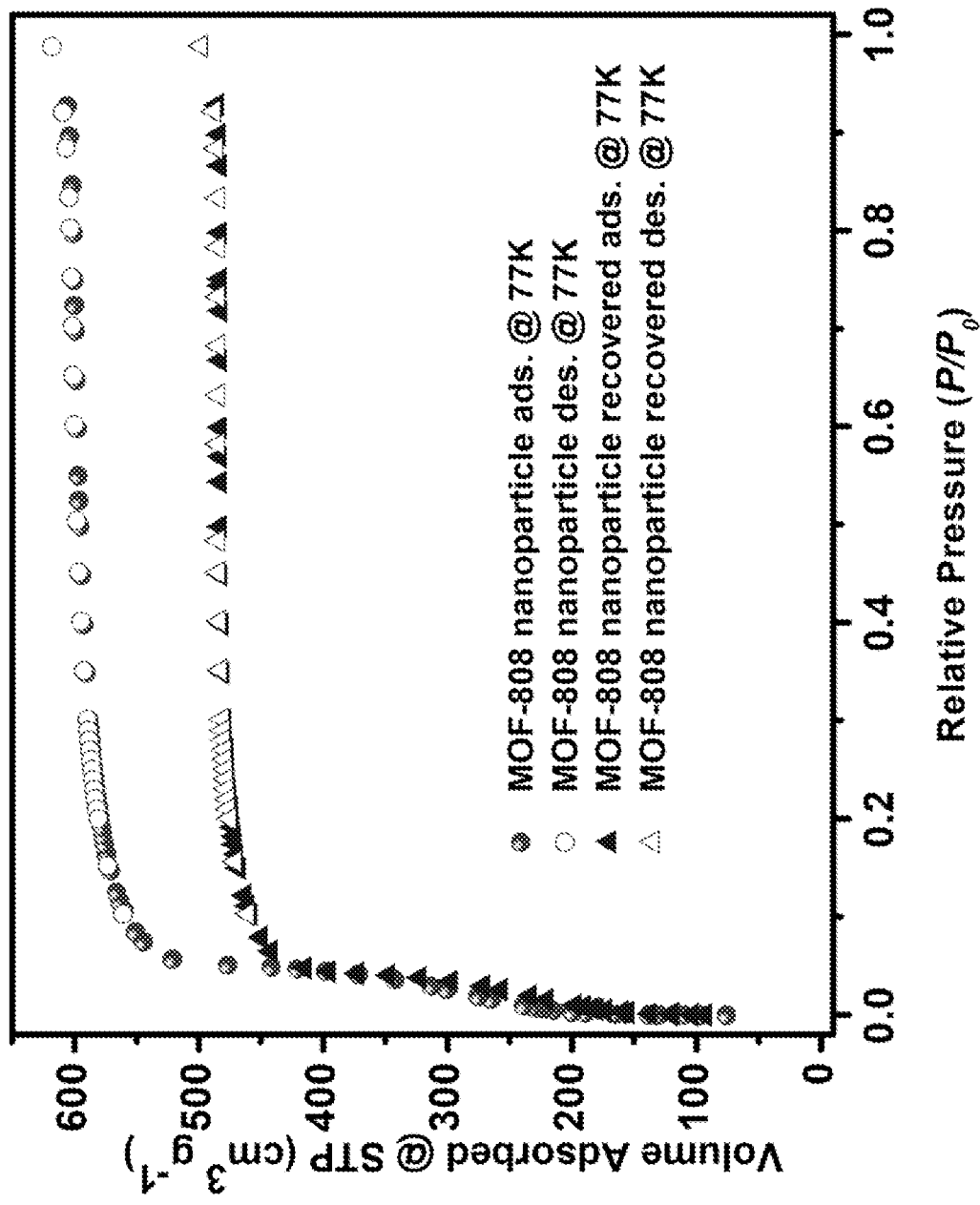
FIG. 10 shows isotherms of MOF-808 nanoparticles and MOF-808 nanoparticles recovered from the MOF-808/PEI/cotton composite. The apparent BET surface areas of fresh and recovered MOF-808 nanoparticles are 2150 and 1720 $m^2/g$, respectively.
Figure 11:
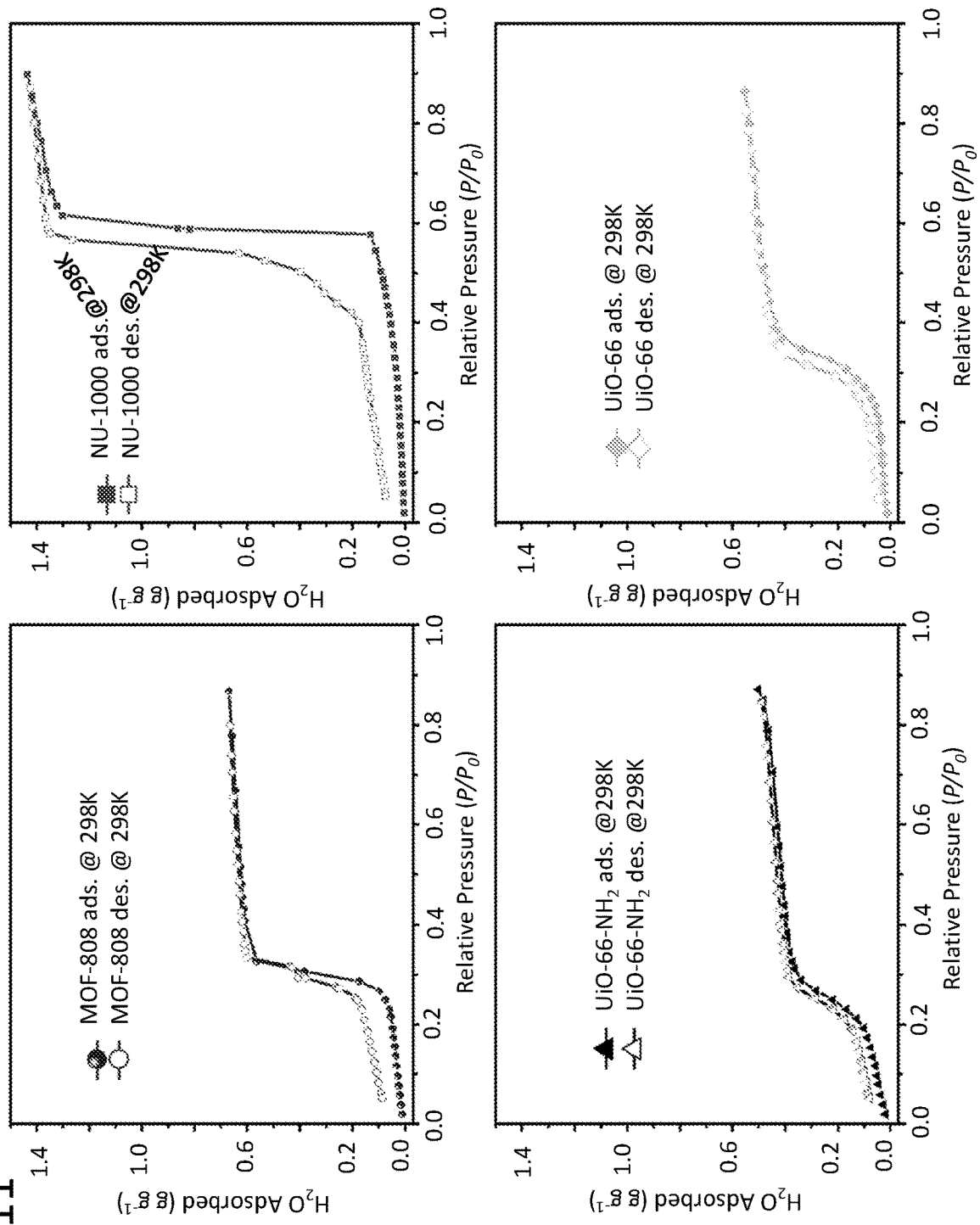
FIG. 11 shows water sorption isotherms at 298 K of MOFs.

Isotherms. FIG. 9 shows N$_2$ sorption isotherms of MOF-808, NU-1000, UiO-66-NH$_2$ and UiO-66. FIG. 10 shows isotherms of MOF-808 nanoparticles and MOF-808 nanoparticles recovered from the MOF-808/PEI/cotton composite. The apparent BET surface areas of fresh and recovered MOF-808 nanoparticles are 2150 and 1720 m$^2$/g, respectively. FIG. 11 shows water sorption isotherms at 298 K of MOFs.

Figure 12:
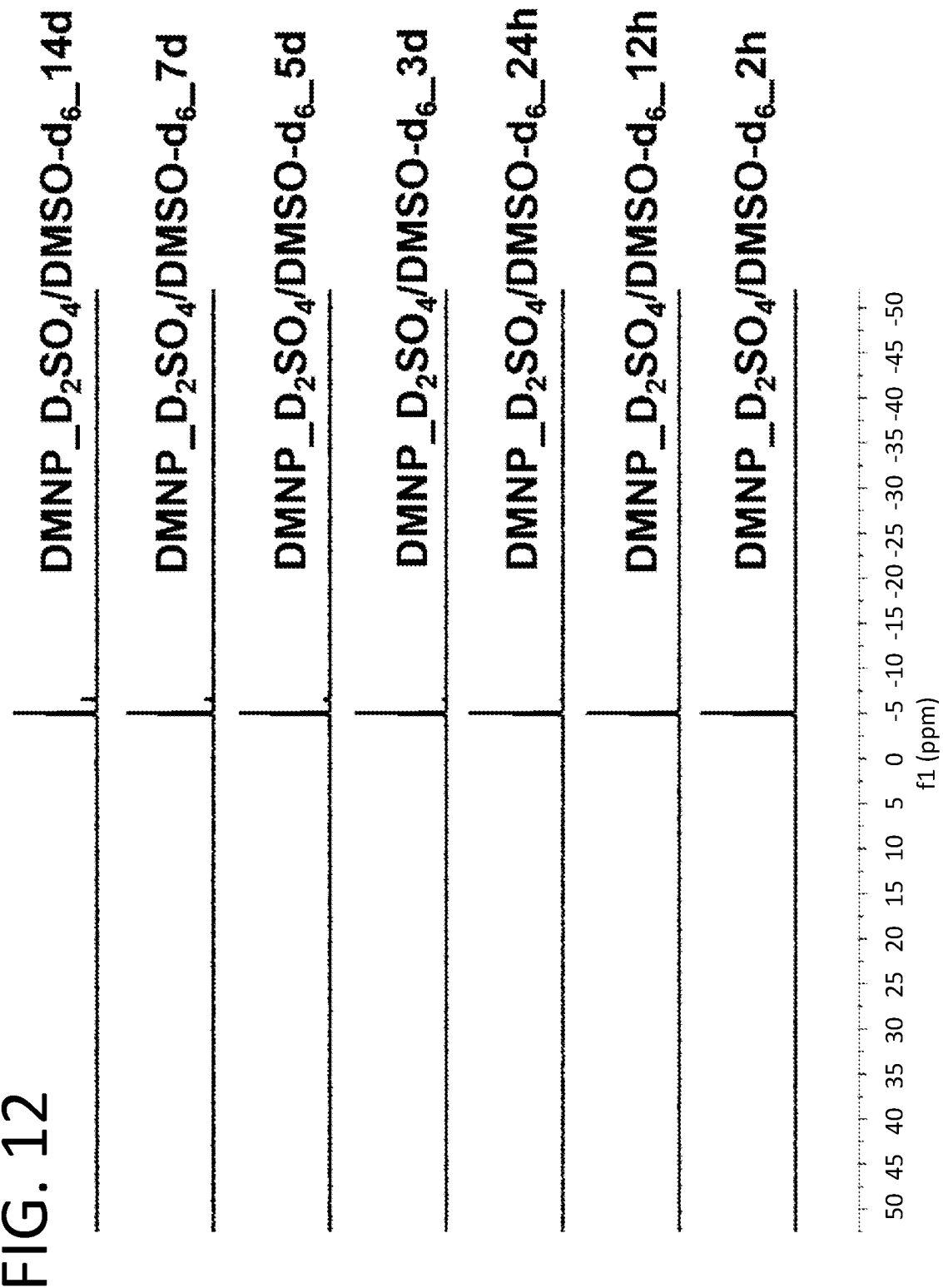
FIG. 12 shows control experiments for determining the background hydrolysis reaction under MOF digestion conditions. The background study of the digestion using $D_2SO_4$/DMSO-$d_6$ and 0.6 mL of $D_2SO_4$/DMSO-$D_6$ (15/100 V/V) was added into the vial containing DMNP (4 µL; 25 µmol) and then transferred to an NMR tube. $^{31}P$ NMR was measured at different times, and no conversion was detected after 2 h, and about 14% conversion of DMNP to M4NP was observed after 14 days. Since typical NMR measurements were performed less than 2 hours after the digestion, the contribution of the background reaction was immeasurably low.

Control Experiments. FIG. 12 shows control experiments for determining the background hydrolysis reaction under MOF digestion conditions. The background study of the digestion using D$_2$SO$_4$/DMSO-d$_6$ and 0.6 mL of D$_2$SO$_4$/DMSO-D$_6$ (15/100 V/V) was added into the vial containing DMNP (4 µL; 25 µmol) and then transferred to an NMR tube. $^{31}$P NMR was measured at different times, and no conversion was detected after 2 h, and about 14% conversion of DMNP to M4NP was observed after 14 days. Since typical NMR measurements were performed less than 2 hours after the digestion, the contribution of the background reaction was immeasurably low.

Figure 13:
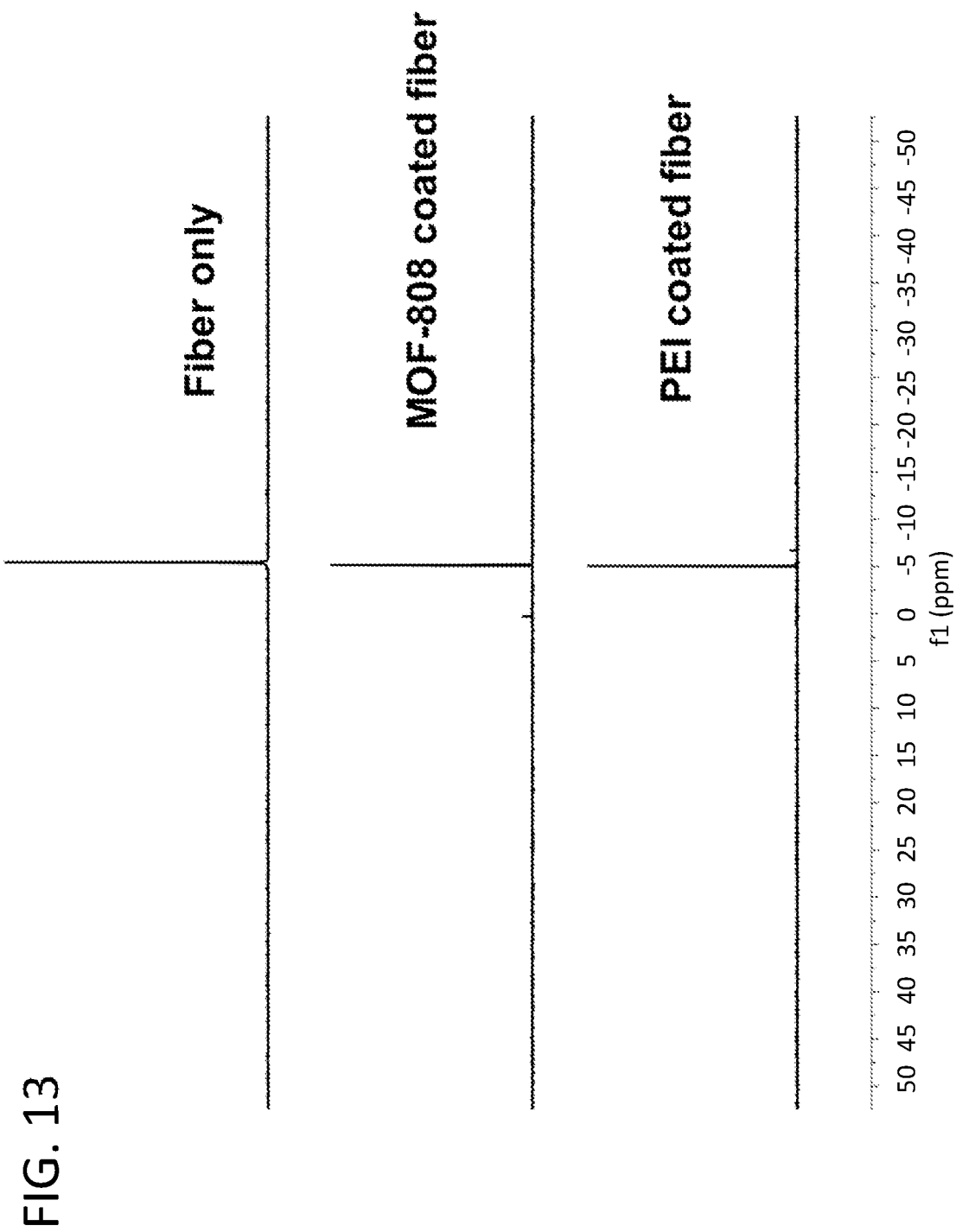
FIG. 13 shows a control test using fiber, MOF-808 coated fiber, and PEI coated fiber in solid-state hydrolysis (50% humidity, 0.5 h).

FIG. 13 shows a control test using fiber, MOF-808 coated fiber, and PEI coated fiber in solid-state hydrolysis (50% humidity, 0.5 h).

Figure 14:
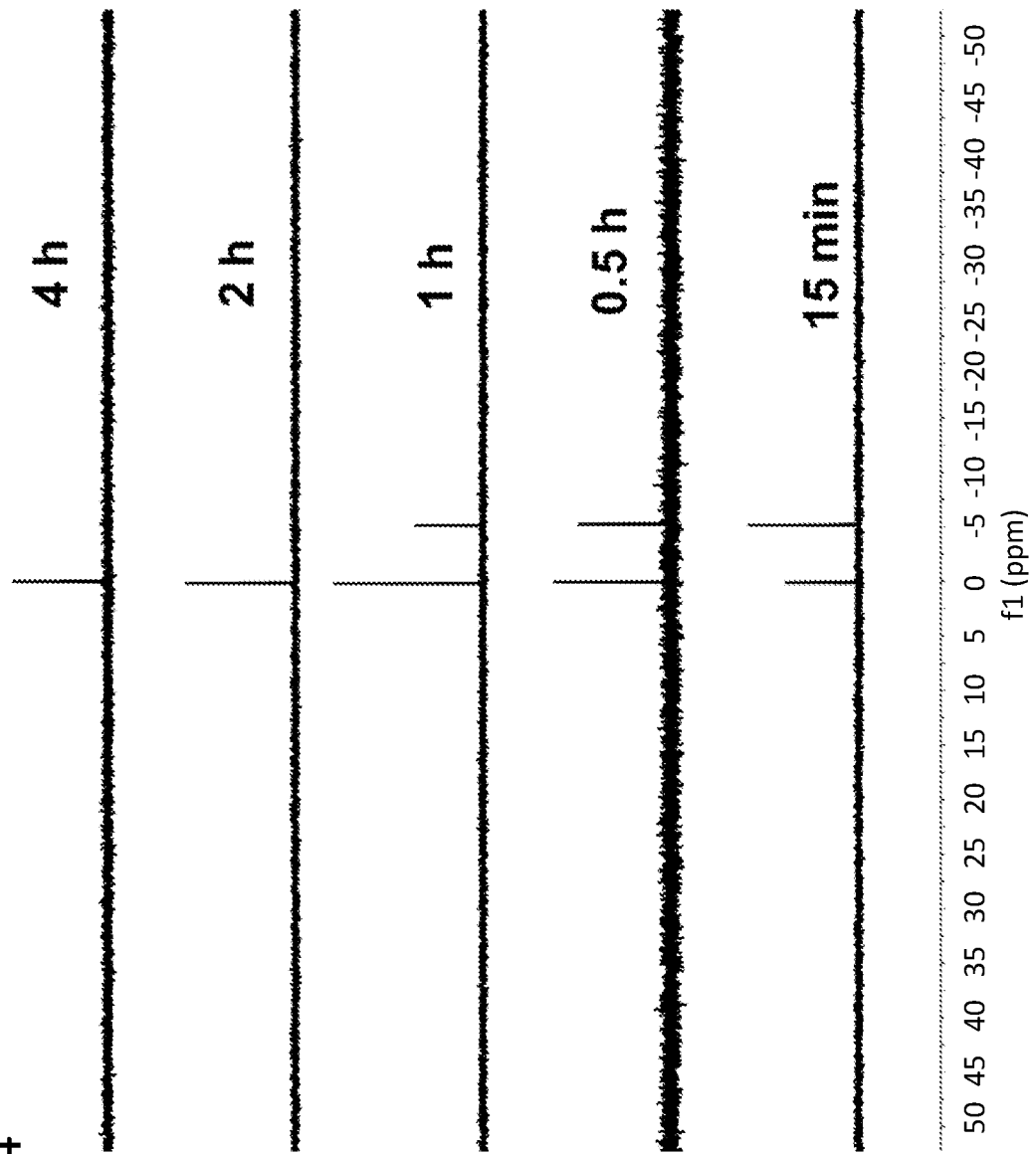
FIG. 14 shows the representative $^{31}P$ NMR spectra of using MOF-808/PEI/fiber composites in solid-state hydrolysis at different time points (at 50% humidity).

FIG. 14 shows the representative $^{31}$P NMR spectra of using MOF-808/PEI/fiber composites in solid-state hydrolysis at different time points (at 50% humidity).

Figure 15:
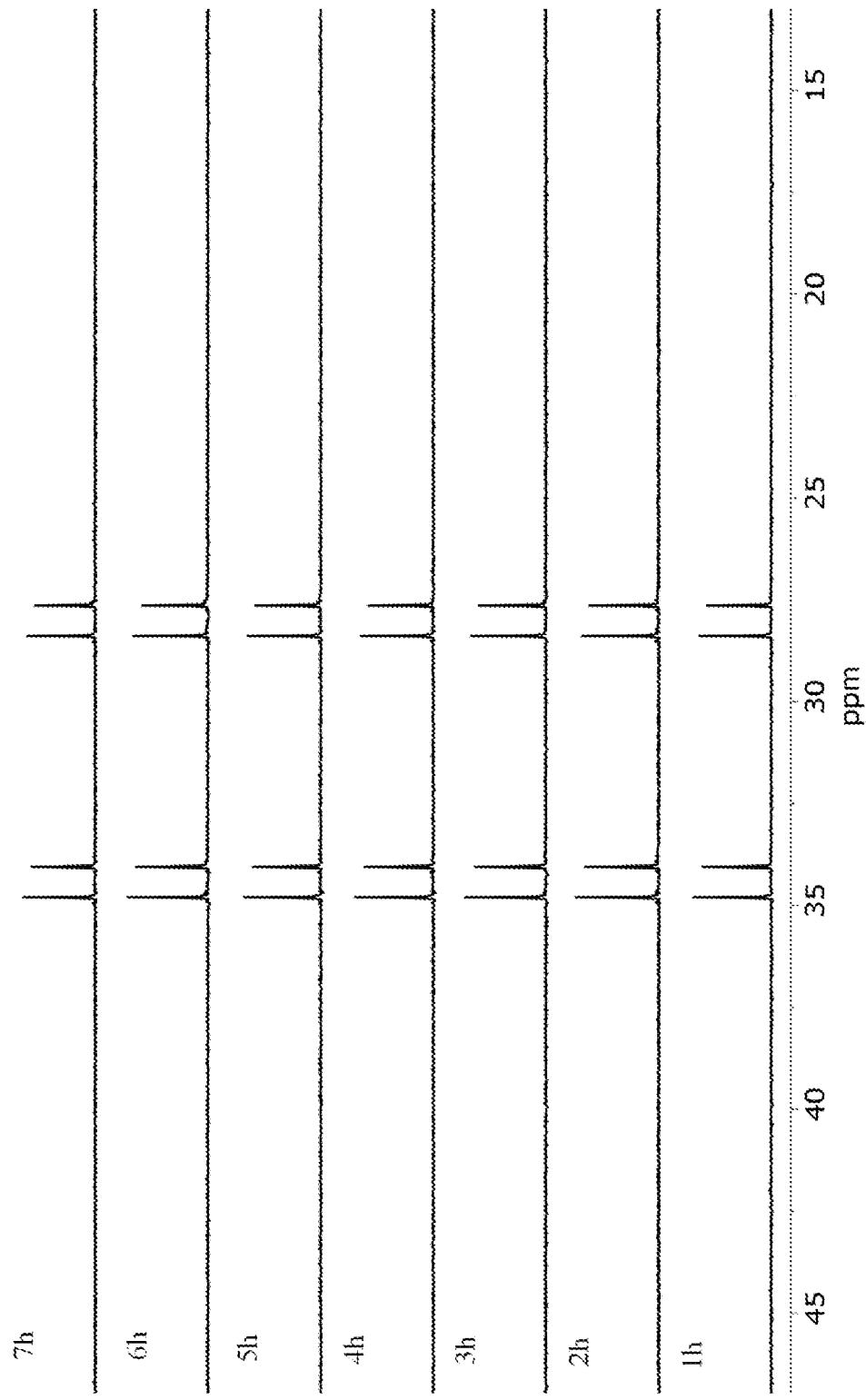
FIG. 15 shows the background study of the digestion using HF/DMSO-$D_6$ (1/9 V/V). MOF-808/PEI fabric was incubated with HF/DMSO-$D_6$ for about 30 min. Then GD was added, and $^{31}P$ NMR measurement was monitored over time.

FIG. 15 shows the background study of the digestion using HF/DMSO-D$_6$ (1/9 V/V). MOF-808/PEI fabric was incubated with HF/DMSO-D$_6$ for about 30 min. Then GD was added, and $^{31}$P NMR measurement was monitored over time.

Figure 16:
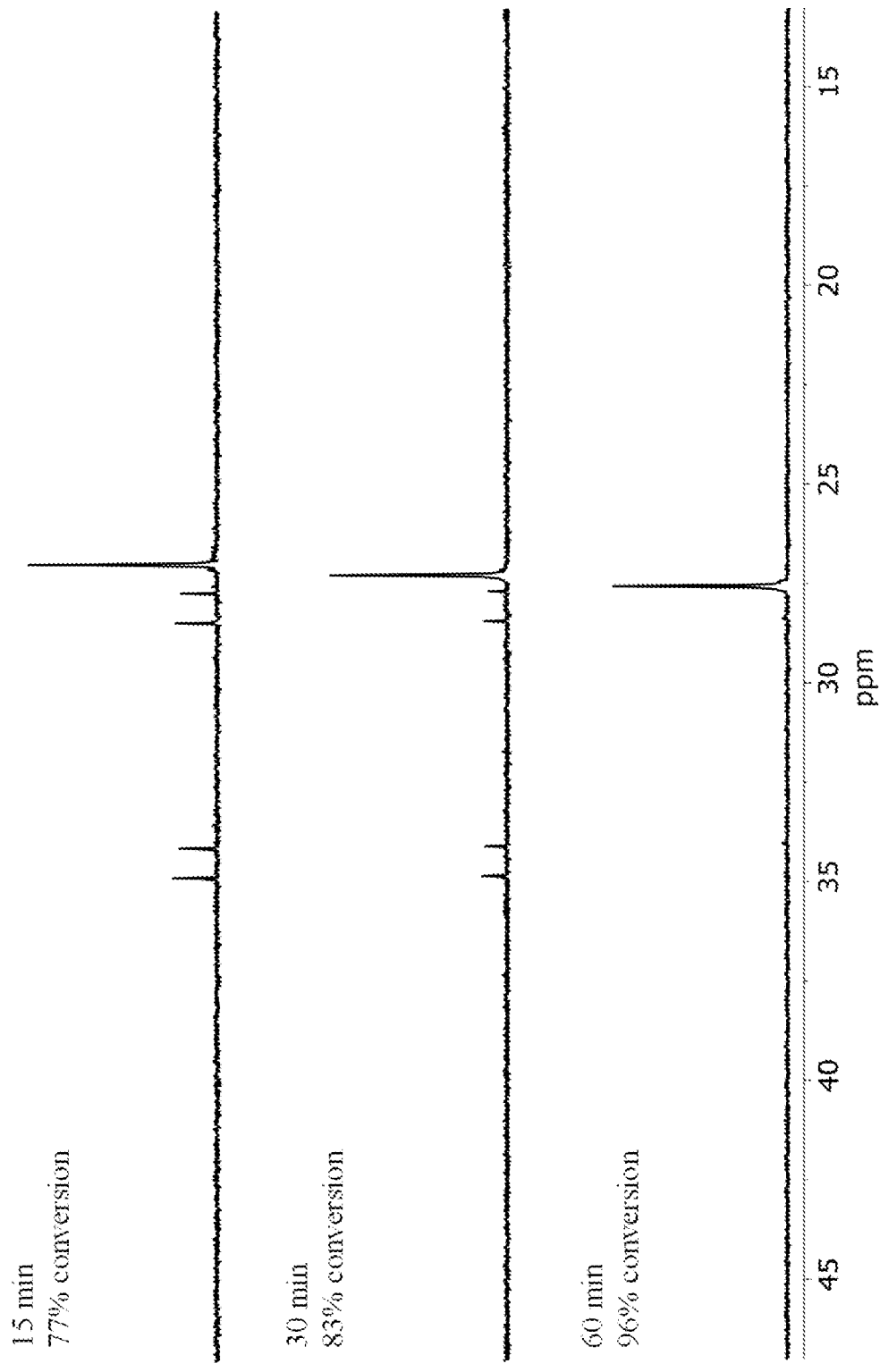
FIG. 16 shows NMR spectra of using MOF-808/PEI/fiber composites in solid-state hydrolysis of GD at different time points. HF/DMSO-$D_6$ (100 µL HF+900 µL DMSO-$D_6$) digestion media were used.

FIG. 16 shows NMR spectra of using MOF-808/PEI/fiber composites in solid-state hydrolysis of GD at different time points. HF/DMSO-D$_6$ (100 μL HF+900 μL DMSO-D$_6$) digestion media were used.

Example 2

This example illustrates a MOF/hydrogel composite coating, where the hydrogel is made by crosslinking a branched PEI to improve the catalytic activity of the composite material for solid-state hydrolysis of organophosphorus based chemicals.

An inexpensive branched polyethylenimine hydrogel (BPEIH), with high amine density, was cross-linked with commercially available ditopic epoxide as a solid buffer to mediate the micro-environment in the MOFs. Solid-state hydrolysis of DMNP by the composite was studied to demonstrate the catalytic performance of this hydrogel modified catalyst under ambient humidity (RH=50%) (FIG. 17A). The newly designed BPEIH/MOF powder applied to a textile fiber showed very fast hydrolysis of DMNP without introducing bulk water into the system. The conversion of DMNP was monitored by comparing the $^{31}$P peak for DMNP (δ=5.0 ppm) to that of a nontoxic hydrolyzed product, dimethyl phosphate anion (δ=0.5 ppm) (FIGS. 17B and 17C). A conversion of 72% and 99% was obtained after 1 min and 10 min, respectively. Kinetic studies revealed a very short initial half-life (t$_{1/2}$) of less than 1 min for degradation of DMNP with a 6 mol. % catalyst loading, indicating a two-order improvement of the efficiency compared with the prior solid-state hydrolysis results (t$_{1/2}$ over 1.6 h).

Figure 18B:
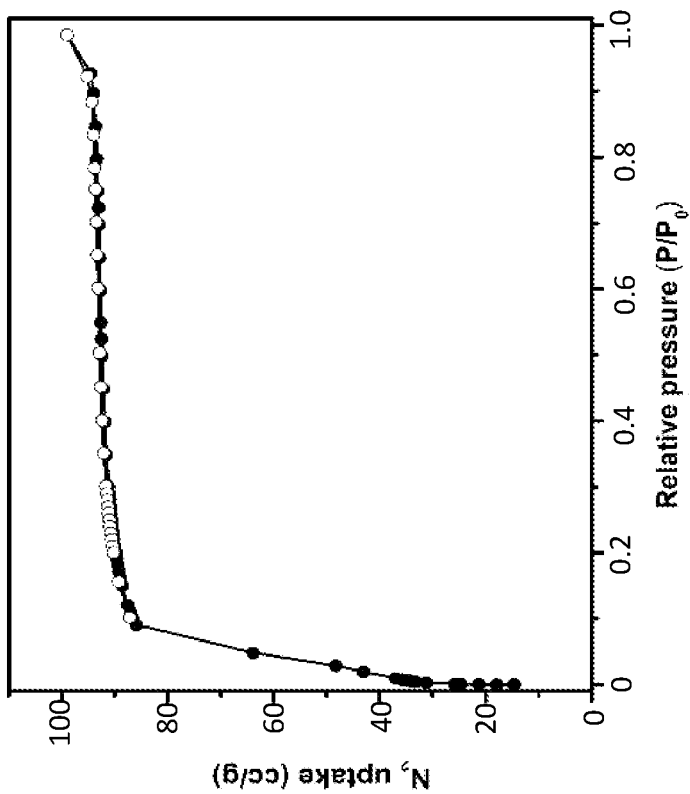
FIG. 18B shows a $N_2$ sorption isotherm of a supercritical $CO_2$ activated BPEIH/MOF-808/fiber sample.
Figure 18A:
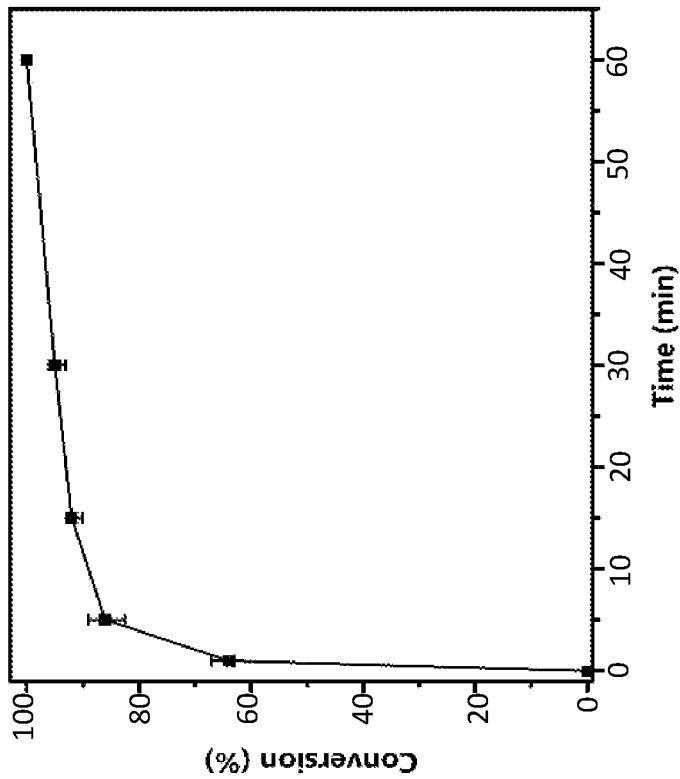
FIG. 18A shows the hydrolysis profile of a DMNP conversion using a BPEIH/MOF-808/fiber.

To further demonstrate the practicality of the hydrogel composite in protective cloth, the BPEIH/MOF composite was coated onto textile fiber using a simple and scalable dip-coating method. Briefly, MOF-808 nanoparticles were dispersed in a mixture of BPEI in a water solution and an epoxide crosslinker solution in ethanol, which was used as the stock suspension for the dip-coating. After a dipping-drying process, the wet cloth (3 cm×3 cm) was incubated in a sealed 8-dram vial over night to get a stable hydrogel composite coating on the fiber. The mass loading based on dry weight of the composite was 12%. The solid-state catalytic hydrolysis of DMNP with the fiber composite under RH=50% presented a half-life of 1.5 min (FIG. 18A) and a nearly total conversion (99%) after 15 min. This represents more than one order of magnitude improvement compared to the method of Example 1. The improved catalytic activity of the hydrogel-based coating should be attributed to the interplay of water present in the hydrogel and the cross-linked buffer. Additionally, a nitrogen isotherm of the composite material (BPEIH/MOF-808/fiber) activated using supercritical carbon dioxide dryers showed a high porosity—similar to that of the MOF-808/fiber—highlighting the usefulness of BPEIH, which allows for accessing materials with permanent porosity (FIG. 18B).

Detailed Method

Preparation of BPEIH/MOF-808 powder composite. A desired amount of BPEI (7.5%-30%.) and 1,3-butadiene diepoxide cross-linker (4%) was dissolved in 5 g of water and cured overnight at ambient temperature to obtain a hydrogel. The obtained hydrogel was ground. MOF-808 nanoparticles (2.2 mg, 1.5 μmol) and BPEIH (20 mg-80 mg) were added into a 2-dram vial and ground, and then swirled via vortex-mixing for 30 sec. The resulting fine powder (100 μm-300 μm) was stored in a sealed vial.

Preparation of BPEIH/MOF-808/fiber composite. A quantity of 0.2 g of BPEI and 0.08 g of 1,3-butadiene diepoxide (50% in ethanol) was added in 2 mL of DI water while stirring over the course of 2 min to get a clear solution. 0.15 g of MOF-808 nanoparticles was added to the hydrogel solution, which was ultrasonicated for 10 min to obtain a uniform suspension. One piece of cotton fabric (3 cm×3 cm) was immersed in the suspension for 10 min. The cotton fabric with about 220% liquid pick-up was carefully placed in a beaker. After sealing with aluminum foil, the wet cloth was left to cure overnight to form a hydrogel composite coating on the cloth.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A textile fiber at least partially coated with a composite, the composite comprising particles comprising metal-organic frameworks that are catalytic for the hydrolysis of an organophosphate compound dispersed in a matrix comprising a polymeric base, wherein the polymeric base comprises a crosslinked hydrogel.

2. The fiber of claim 1, wherein the metal-organic frameworks comprise Zr$_6$ nodes connected by multitopic organic linkers.

3. The fiber of claim 1, wherein the polymeric base comprises a crosslinked polyethyleneimine hydrogel.

4. The fiber of claim 2, wherein the metal-organic frameworks comprise MOF-808, UiO-66, UiO-66-NH$_2$, NU-1000, NU-901, NU-1601, NU-1602, or combinations of two or more thereof.

5. The fiber of claim 2, wherein the crosslinked hydrogel is a crosslinked polyethyleneimine hydrogel.

6. A fabric formed from one or more of the textile fibers of claim 1.

7. A face mask comprising the fabric of claim 6.

8. An article of clothing comprising the fabric of claim 6.

9. A method of disabling a toxic agent comprising an organophosphate compound having a hydrolysable bond, the method comprising exposing the organophosphate compound to a fabric coated with a composite, the composite comprising particles of metal-organic frameworks that are catalytic for the hydrolysis of the organophosphate compound dispersed in a matrix comprising a polymeric base, wherein the polymeric base comprises a crosslinked hydrogel, in an atmosphere having a relative humidity in the range from 10% to 100%, wherein the metal-organic frameworks catalyze the hydrolysis of the hydrolysable bond in the presence of water vapor absorbed from the atmosphere.

10. The method of claim 9, wherein the organophosphate compound is an organophosphonate.

11. The method of claim 9, wherein the metal-organic frameworks comprise $Zr_6$ nodes connected by multitopic organic linkers.

12. The method of claim 9, wherein the polymeric base comprises a crosslinked polyethyleneimine hydrogel.

13. The method of claim 9, wherein the metal-organic frameworks comprise $Zr_6$ nodes connected by multitopic organic linkers.

14. The method of claim 13, wherein the metal-organic frameworks comprise MOF-808, UiO-66, UiO-66-$NH_2$, NU-1000, NU-901, NU-1601, NU-1602, or combinations of two or more thereof.

15. The method of claim 13, wherein the crosslinked hydrogel is a crosslinked polyethyleneimine hydrogel.

16. A method of forming an article of clothing, the method comprising:
   applying a coating of a liquid solution comprising metal-organic frameworks that are catalytic for the hydrolysis of an organophosphate and dispersed in a matrix comprising a polymeric base comprising a crosslinked hydrogel to textile fibers in a fabric;
   drying the fabric to remove water and volatile components; and
   incorporating the dried fabric into an article of clothing.

17. A method of activating an article of clothing made according to the method of claim 16, the method comprising exposing the article of clothing to an atmosphere in which the relative humidity is in the range from 10% to 100%.

18. The fiber of claim 1, wherein the fiber is a cotton fiber, a cellulose fiber, or a nylon fiber.

* * * * *